US009354833B2

(12) United States Patent
Kinoshita et al.

(10) Patent No.: US 9,354,833 B2
(45) Date of Patent: May 31, 2016

(54) COMPUTER READABLE INFORMATION RECORDING MEDIUM STORING PRINT JOB EDITING PROGRAM, PRINT JOB EDITING APPARATUS, PRINT JOB EDITING METHOD AND PRINTING SYSTEM FOR DETERMINING VALID FUNCTIONS BASED ON APPARATUS CAPABILITIES AND PRINTING CONDITIONS

(75) Inventors: Akihiro Kinoshita, Tokyo (JP); Yoshikazu Tanaka, Tokyo (JP); Risa Tsutsui, Tokyo (JP); Hongyang Guo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 159 days.

(21) Appl. No.: 13/409,203

(22) Filed: Mar. 1, 2012

(65) Prior Publication Data
US 2012/0224222 A1     Sep. 6, 2012

(30) Foreign Application Priority Data

Mar. 2, 2011    (JP) .................................. 2011-045640
Dec. 26, 2011    (JP) .................................. 2011-284021

(51) Int. Cl.
*G06K 15/02*    (2006.01)
*G06F 3/12*    (2006.01)

(52) U.S. Cl.
CPC ............ *G06F 3/1285* (2013.01); *G06F 3/1205* (2013.01); *G06F 3/1255* (2013.01)

(58) Field of Classification Search
CPC .... G06F 3/1205; G06F 3/1255; G06F 3/1285
USPC ....................................................... 358/1.15
See application file for complete search history.

(56) References Cited

U.S. PATENT DOCUMENTS

| 4,944,031 | A | * | 7/1990 | Yoshino et al. ..... | G03G 15/5066 399/17 |
| 5,847,857 | A | * | 12/1998 | Yajima et al. ......... | G06F 3/1215 358/296 |
| 6,215,977 | B1 | * | 4/2001 | Otani ....................... | B41J 13/00 399/407 |
| 7,232,267 | B2 | * | 6/2007 | Uchida ................. | G06F 9/4411 358/1.15 |

(Continued)

FOREIGN PATENT DOCUMENTS

| EP | 2 116 929 | | 11/2009 | | |
| EP | 2116929 | A1 * | 11/2009 | ......... | G06Q 10/0633 |

(Continued)

OTHER PUBLICATIONS

Abstract of JP 2007-241877 published Sep. 20, 2007.

(Continued)

*Primary Examiner* — Tammy Pham
*Assistant Examiner* — Edwin S Leland, III
(74) *Attorney, Agent, or Firm* — Harness, Dickey & Pierce, P.L.C.

(57) ABSTRACT

A device and method for obtaining information of a capability of an apparatus that is connected with a computer or a capability of an apparatus that is used in a printing process in which the computer is used; determining functions that become invalid, from among functions that have been set in a received print job, based on the information of the capability of the apparatus and printing conditions that a print job editing program has; and displaying a list of the functions that become invalid, and is used to confirm a cancellation of the setting of the functions that become invalid.

18 Claims, 19 Drawing Sheets

(56) References Cited

U.S. PATENT DOCUMENTS

| | | | | |
|---|---|---|---|---|
| 7,551,307 B2* | 6/2009 | Motohashi | H04N 1/00127 | 355/18 |
| 8,228,514 B2* | 7/2012 | Yokoyama | G06Q 10/10 | 358/1.13 |
| 8,274,697 B2* | 9/2012 | Sawaguchi | G06G 21/046 | 235/492 |
| 8,368,905 B2* | 2/2013 | Miyata | G06F 3/1204 | 358/1.1 |
| 2002/0120742 A1* | 8/2002 | Cherry | G06F 3/1205 | 709/226 |
| 2003/0066027 A1* | 4/2003 | Nakagiri | G06F 3/1204 | 715/255 |
| 2004/0153530 A1* | 8/2004 | Machida | H04L 41/0803 | 709/220 |
| 2004/0218201 A1* | 11/2004 | Lermant | G06F 3/1205 | 358/1.13 |
| 2005/0275869 A1* | 12/2005 | Yokoyama | G06Q 50/00 | 358/1.14 |
| 2006/0158674 A1* | 7/2006 | Mizoguchi | G06F 3/1205 | 358/1.13 |
| 2007/0109593 A1* | 5/2007 | Ohta | G06F 3/1204 | 358/1.15 |
| 2008/0115059 A1* | 5/2008 | Sakai | G06F 3/1204 | 715/700 |
| 2008/0162736 A1* | 7/2008 | Tanaka | G06F 3/1204 | 710/7 |
| 2008/0174825 A1* | 7/2008 | Hatakeyama | B42C 11/04 | 358/1.18 |
| 2009/0021757 A1* | 1/2009 | Liu | G06F 3/1207 | 358/1.13 |
| 2009/0217268 A1* | 8/2009 | Pandit | G06F 3/1288 | 718/100 |
| 2009/0244620 A1* | 10/2009 | Takahashi | G06F 3/1205 | 358/1.15 |
| 2009/0251728 A1 | 10/2009 | Fukasawa | | |
| 2009/0281862 A1* | 11/2009 | Conescu | G06Q 10/0633 | 705/7.27 |
| 2010/0074633 A1* | 3/2010 | Kuwasaki | H04N 1/00222 | 399/8 |
| 2010/0118337 A1* | 5/2010 | Kiuchi | H04N 1/00233 | 358/1.15 |
| 2011/0002003 A1* | 1/2011 | Suwabe | G06F 21/629 | 358/1.14 |
| 2011/0102830 A1* | 5/2011 | Naitoh | G06F 3/1204 | 358/1.15 |
| 2011/0107432 A1* | 5/2011 | Oomori | G06F 3/1222 | 726/27 |
| 2011/0128578 A1* | 6/2011 | Umenaga | G06F 3/1204 | 358/1.15 |
| 2011/0222107 A1* | 9/2011 | Williams | G06F 3/1204 | 358/1.15 |
| 2011/0249282 A1* | 10/2011 | Takami et al. | H04N 1/38 | 358/1.9 |
| 2012/0013943 A1* | 1/2012 | Shibao | G06K 15/1806 | 358/1.15 |
| 2012/0019851 A1* | 1/2012 | Takazawa | G06F 3/1205 | 358/1.13 |
| 2012/0092707 A1* | 4/2012 | Saito | G06F 3/1208 | 358/1.15 |
| 2012/0162691 A1* | 6/2012 | Maeda et al. | H04N 1/00411 | 358/1.14 |

FOREIGN PATENT DOCUMENTS

| | | | |
|---|---|---|---|
| JP | 2000227847 A | | 8/2000 |
| JP | 2000227847 A | * | 8/2000 |
| JP | 2003-091373 A | | 3/2003 |
| JP | 2004234510 A | | 8/2004 |
| JP | 2004234510 A | * | 8/2004 |
| JP | 2007-241877 A | | 9/2007 |
| JP | 2007241877 A | * | 9/2007 |
| JP | 2009-271913 A | | 11/2009 |
| JP | 2010-244317 A | | 10/2010 |

OTHER PUBLICATIONS

Abstract of JP 2004-234510 published Aug. 19, 2004.
Abstract of JP 2000-227847 published Aug. 15, 2000.
Extended European Search Report for corresponding European patent application No. 12157469.3 dated Jan. 27, 2014.

* cited by examiner

FIG.14

| TIMING | FUNCTION INFORMATION | FUNCTIONAL PROHIBITION INFORMATION | LOGICAL PROHIBITION INFORMATION |
|---|---|---|---|
| RECEIVING PRINT JOB | SELECTABLE, CONTRADICTION PERMITTED | SELECTABLE, CONTRADICTION PERMITTED | SELECTABLE, CONTRADICTION PERMITTED |
| CHANGING DESIGNATION OF PRINTER APPARATUS | CANCEL ALL ERRONEOUS FUNCTIONS OR CANCEL PROCESSING | SELECTABLE, CONTRADICTION NOT PERMITTED | DON'T CARE |
| CARRYING OUT PRINTING | CANCEL ALL ERRONEOUS FUNCTIONS OR CANCEL PROCESSING | SELECTABLE, CONTRADICTION NOT PERMITTED | SELECTABLE, CONTRADICTION PERMITTED |

FIG.18

```
-<DevCaps xmlns:xxxmr="XXXReady" DevNS="XXXReady" Name=xxxmr:StapleParams">
 -<DevCap DevNS=XXXReady">
   <EnumerationState AllowedValueLsit="False 1LeftA 1RightA 2Left 2Right 2Up Center"
    HasDefault="false" Name="Stitching" />
  </DevCap>
</DevCaps>
```

FIG.19

```
<Comment xmlns:xxxmr="XXXReady" Name=" xxxmr:Constraints"><UIConstraints>
<UIConstraint optflg="false" option="InputSlot" value="BypassTray"/> <Constraint optflg="false" option="Duplex" value="LongEdgeBinding"/> <Constraint optflg="false" option="Duplex" value="ShortEdgeBinding"/> <Constraint optflg="false" option="Stitching" value="1LeftA"/> <Constraint optflg="false" option="Stitching" value="1RightA"/> <Constraint optflg="false" option="Stitching" value="2Left"/> <Constraint optflg="false" option="Stitching" value="2Right"/> <Constraint optflg="false" option="Stitching" value="Center"/> <Constraint optflg="false" option="Stitching" value="2Up"/> <Constraint optflg="false" option="PunchHoleType" value="2Even"/> <Constraint optflg="false" option="Folding" value="ZfoldBottom"/> <Constraint optflg="false" option="PunchHoleType" value="3Even"/> <Constraint optflg="false" option="Folding" value="ZfoldRightUneven"/> <Constraint optflg="false" option="Folding" value="ZfoldLeft"/> <Constraint optflg="false" option="Folding" value="Twofold"/>
```

COMPUTER READABLE INFORMATION RECORDING MEDIUM STORING PRINT JOB EDITING PROGRAM, PRINT JOB EDITING APPARATUS, PRINT JOB EDITING METHOD AND PRINTING SYSTEM FOR DETERMINING VALID FUNCTIONS BASED ON APPARATUS CAPABILITIES AND PRINTING CONDITIONS

BACKGROUND OF THE INVENTION

1. Field of the Invention

The present invention relates to a computer readable information recording medium storing a print job editing program, a print job editing apparatus, a print job editing method and a printing system for editing a print job.

2. Description of the Related Art

A company in the commercial printing industry, which receives printed pages (a catalog, an advertisement or the like) from a customer, generates printed output pages requested by the customer from the printed pages, delivers the thus generated printed output pages to the customer and receives a reward from the customer, carries out plural processes from the reception of the printed pages to the delivery of the printed output pages. The plural processes from the reception of the printed pages to the delivery of the printed output pages include, for example, a reception of printed pages from the customer, a reception of printing conditions for the printed output pages from the customer, a prepress process such as a color change, a layout change and a binding position change, proofing for the customer to check the prepress result, a printing process, a post-press process (post-process) such as binding the printed output pages, compression bonding of the printed output pages and/or the like after the printing process and delivery of the printed output pages to the customer. It is noted that the plural processes from the reception of the printed pages to the delivery of the printed output pages may increase or decrease depending on the printing conditions for the printed output pages requested by the customer.

In the related art of the commercial printing industry, there are many orders from customers to carry out printing in large quantities, and the above-mentioned plural processes from the reception of the printed pages to the delivery of the printed output pages, for example, are carried out to execute the many orders. Further, in many cases, for such orders of printing in large quantities, printing conditions from customers for printed output pages are fixed. Therefore, in the commercial printing industry in the related art, printed output pages requested by customers are generated through cycles in which a large quantity (lot) of printing is carried out according to fixed printing conditions, and after the printing for the lot is finished, another lot of printing is carried out after the printing conditions are changed.

In the printing cycles, the above-mentioned plural processes from the reception of the printed pages to the delivery of the printed output pages are carried out in many cases when printing conditions from customers for printed output pages are changed. Therefore, in a case where printing conditions from customers for printed output pages are not changed, a commercial printer can carry out printing continuously through the identical processes, and thus, it is possible to carry out printing in large quantities with high efficiency.

Recently, a print on demand (POD) market has appeared in which a commercial printer delivers a relatively small lot of printed output pages to a customer with a short delivery time. In the POD market, orders from plural customers are received in many cases. As a result, in the POD market, in many cases, printed pages sent to a commercial printer from customers include many different types of printed pages, or printing conditions requested by the customers for printed output pages include many different conditions.

Furthermore, recently, digitizing of printed pages has proceeded, and a computer has been used to control generation of printed output pages. For example, workflow techniques of sending printed pages from a customer in a form of electronic data to a printer via a communication network and/or controlling the above-mentioned plural processes from reception of printed pages to delivery of printed output pages have appeared. For example, according to the workflow techniques, there is a configuration in which printing operations in the above-mentioned plural processes from reception of printed pages to delivery of printed output pages are defined by a job ticket called "JDF" (job definition format), and the printing operations are controlled in a printing system.

Along with such a change in the printing environment, commercial printers have proceeded with introduction of computers into printing systems for generating printed output pages to execute received orders. On the other hand, commercial printers currently need to build printing systems which can meet various printing conditions for printed output pages requested by customers and so forth. Further, in order to generate various printed output pages requested by customers, it becomes necessary to meet customers' requests, from a system viewpoint by introducing plural printer apparatuses and/or peripheral apparatuses (i.e., device apparatuses). Further, from a working process viewpoint, changing the above-mentioned plural processes from reception of printed pages to delivery of printed output pages becomes necessary at relatively short cycles.

Commercial printers thus need to meet customers' requests in the above-mentioned manner, and also, need to improve the operational efficiency in order to produce profits. As a method to improve the operational efficiency, there is a method of simplifying operations.

In a prepress process in a production printing (PP) business, not only it is possible to carry out printing settings (i.e., generate a job ticket) after designating a printer apparatus to be used for printing, but also it is possible to change the designation of the printer apparatus after generating the job ticket. It is noted that, for the job ticket, a printing setting for a function that becomes unavailable (invalid function) is prohibited, depending on the capability of each printer apparatus. For example, there is a case where a function available (valid function) when a job ticket is generated becomes unavailable as a result of a designation of a printer apparatus being changed.

The following technology is known (for example, see Japanese Laid-Open Patent Application No. 2007-241877). A printing control apparatus having a printer driver includes an information obtaining part that obtains, from a printer, text data recording optional configuration information and information depending on the type of the printer of the printer connected via a communication network; and a storage part that stores the obtained text data as a file. The printer driver changes a printing setting screen page based on the obtained text data.

SUMMARY OF THE INVENTION

According to an aspect of the present invention, a computer readable information recording medium stores a print job editing program. The print job editing program functions, when executed by one or more processors of a computer, as a capability obtaining part configured to obtain information of a capability of an apparatus that is connected with the computer or a capability of an apparatus that is used in a printing process in which the computer is used; a determination part configured to, when the capability obtaining part has obtained the information of the capability of the apparatus, determine functions that become invalid from among functions that have been set in a received print job, based on the information of the capability of the apparatus and printing conditions that the print job editing program has; and a display part configured to display a list of the functions that become invalid, and be used to confirm a cancellation of the setting of the functions that become invalid.

Other objects, features and advantages of the present invention will become more apparent from the following detailed description when read in conjunction with the accompanying drawings.

BRIEF DESCRIPTION OF THE DRAWINGS

FIG. 14 shows a table of one example of a relationship of timing of receiving a print job, timing of changing a designation of a printer apparatus and timing of carrying out printing with function information, functional prohibition information and logical prohibition information;

FIG. 18 illustrates one example of a part of a DevCaps file; and

FIG. 19 illustrates one example of a part of a prohibition condition part of a DevCaps file.

DETAILED DESCRIPTION OF THE PREFERRED EMBODIMENTS

Figure 1:
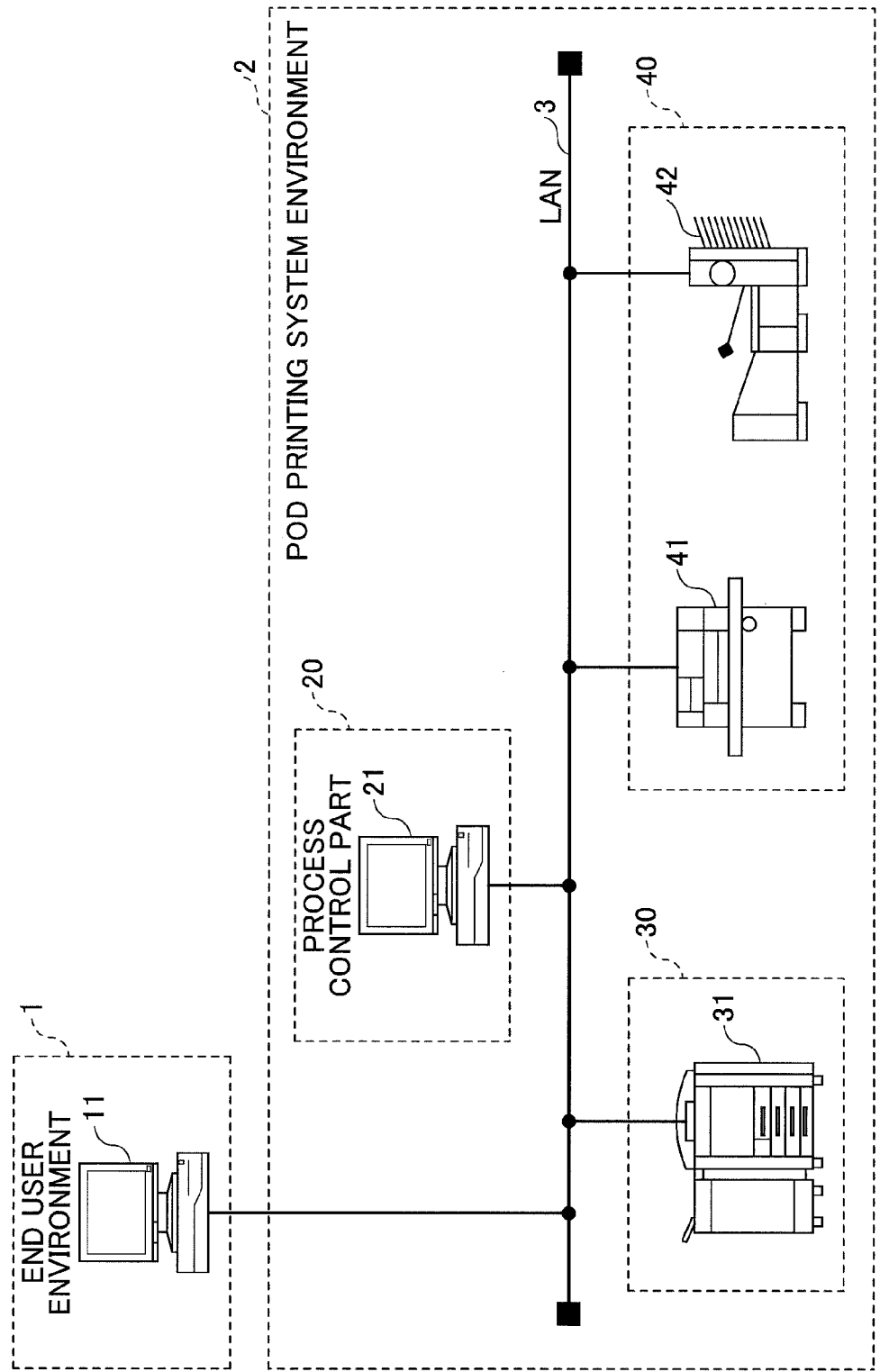
FIG. 1 is a block diagram showing one example of an overall configuration of a printing system according to an embodiment of the present invention.

In a case where there is a function that becomes unavailable as a result of a designation of a printer apparatus being changed, as mentioned above, and the function has been included in a printing setting that has been carried out before the change of the designation of the printer apparatus, printing may be carried out with a printing setting that an operator does not intend when the function included in the printing setting is simply canceled. It is noted that a similar problem also occurs in a case where a stored print job is started, and in a case where printing data accompanied by a job ticket is received.

Embodiments of the present invention have been devised in consideration of the above-mentioned problem, and an object of the embodiments is to provide a computer readable information recording medium storing a print job editing program, a print job editing apparatus, a print job editing method and a printing system, by which a cancellation of a printing setting by an operator is received while the operator sees a function that becomes invalid of the printing setting.

According to an embodiment of the present invention, a computer readable information recording medium stores a print job editing program. The print job editing program functions as, when executed by one or more processors of a computer, a capability obtaining part configured to obtain information of a capability of an apparatus that is connected with the computer or a capability of an apparatus that is used in a printing process in which the computer is used; a determination part configured to determine, when the capability obtaining part has obtained the information of the capability of the apparatus, functions that become invalid, from among functions that have been set in a received print job, based on the information of the capability of the apparatus and printing conditions that the print job editing program has; and a display part configured to display a list of the functions that become invalid, and be used to confirm a cancellation of the setting of the functions that become invalid.

It is noted that a method, an apparatus, a system, a computer program, a computer readable information recording medium, a data structure, or the like, to which elements or expressions of the embodiments of the present invention or any combinations of the elements are applied, are also effective as embodiments of the present invention.

According to the embodiments of the present invention, it is possible to provide a computer readable information recording medium storing a print job editing program, a print job editing apparatus, a print job editing method and a printing system, by which a cancellation of a printing setting by an operator is received while the operator understands a function (that become invalid) of the printing setting.

Next, embodiments of the present invention will be described with reference to the figures. It is noted that a printing system which will now be described is one for the purpose that readers can easily understand the embodiments of the present invention, and embodiments of the present invention are not limited to the printing system described below.

First Embodiment

<System Configuration>

FIG. 1 is a block diagram showing one example of an overall configuration of a printing system according to a first embodiment of the present invention. The printing system includes an end user environment 1 and a POD printing system environment 2 which are connected together using a network 3 such as a local area network (LAN).

The end user environment 1 is an environment having a client PC 11 connected to, for example, an intranet in a company. In the client PC 11, a print job editing application is loaded as one example of applications for a POD printing business, and the client PC 11 can be used for carrying out generation of a print job and/or editing the generated print job.

The print job editing application performs, when executed by one or more processors, a Number Up imposition function to paste plural logical page images on a side of a sheet of paper and/or an image editing function to add a header, a footer, a page number and so forth to the side of the sheet of paper. Further, the print job editing application performs, when executed by one or more processors, designations of punching (i.e., punching holes in a sheet of paper) instructions, stapling instructions and so forth for bookbinding.

The POD printing system environment 2 includes a process control part 20, a digital printing part 30 and a post-press part 40 which are connected together in an on-line state. The process control part 20 gives instructions for operations of respective processes of the digital printing part 30 and/or the post-press part 40, and manages a workflow of the POD printing system environment 2 in a unifying manner.

The process control part 20 receives a print job (printing order) from the end user environment 1, and stores the received print job. The process control part 20 assembles the operations of respective processes as a workflow based on the print job given by an end user, efficiently carries out scheduling of operations of the digital printing part 30, the post-press part 40 and respective workmen, and/or reports an error to an operator if necessary when the error occurs during automatic operation. Generally speaking, the process control part 20 includes one or more PC servers 21.

The digital printing part 30 reads a paper manuscript received from the end user using a scan device of a monochrome multifunction peripheral (MFP), a color MFP or the like and photocopies the paper manuscript using a printing device of the monochrome MFP, the color MFP or the like according to instructions included in the print job received from the process control part 20. The digital printing part 30 may also carry out printing according to a document and/or an image file received from the end user from the client PC 11 via a printer driver and/or a hot folder, a document and/or an image file obtained from scanning a paper manuscript, or a document and/or an image file obtained from editing the above-mentioned document and/or image file, using the printing device of the monochrome MFP, the color MFP or the like. It is noted that in the first embodiment of the present invention, it is also possible that the process control part 20 is not provided, and the end user terminal (client PC) 11 is directly connected with a printer apparatus 31 of the digital printing part 30.

The digital printing part 30 has a different configuration of installing a printer apparatus(es) 31 therein depending on the POD printing system environment 2. In many cases, the digital printing part 30 has a combination of color or monochrome printing apparatuses 31 which can carry out printing at high speed with high quality. The printer apparatus 31 can carry out not only a simple printing function but also post-process of printing such as stapling, punching, sheet cutting, case binding, ring binding and so forth at the same time with the printing in an on-line manner. According to the first embodiment of the present invention, it is assumed that a printer A and a printer B are connected with the network 3 as the printer apparatuses 31 (the details will be described later).

The post-press part 40 controls post-process devices such as a folding machine, a saddle stitching binder, a case binding machine, a cutting machine, an inserter, a collator, and so forth, according to operation instructions for a post-press job received from the process control part 20. Further, the post-press part 40 carries out finishing processing such as folding, saddle stitching binding, case binding, cutting, collating, and so forth, on recording paper sheets output from the digital printing part 30. The post-press part 40 includes post-process apparatuses for carrying out a post-press (post-process) after printing such as a stapler 41, punching machine 42, and so forth.

The post-process apparatuses included in the post-press part 40 may be those that are not connected via the network 3. The post-process apparatuses included in the post-press part 40, not connected via the network 3, are examples of apparatuses that are used in a printing process in which the client PC 11 is used.

The end user uses the client PC 11 of the end user environment 1 to give instructions to carry out editing an image, imposition, inserting text, the post-process, and so forth, using the applications for a POD printing business, and orders a print job (transmits a print job) to the process control part 20 of the POD printing system environment 2. The print job includes ordering information called a job ticket and printing data.

According to information (printing settings) included in the print job, the PC server 21 of the process control part 20 generates a print job (printing order), and gives instructions for the printing data to the digital printing part 30 and the post-press part 40. The post-press part 40 includes the stapler 41 having a separate stapling function and the punching machine 42 having a separate punching function.

<Hardware Configuration>

Figure 2:
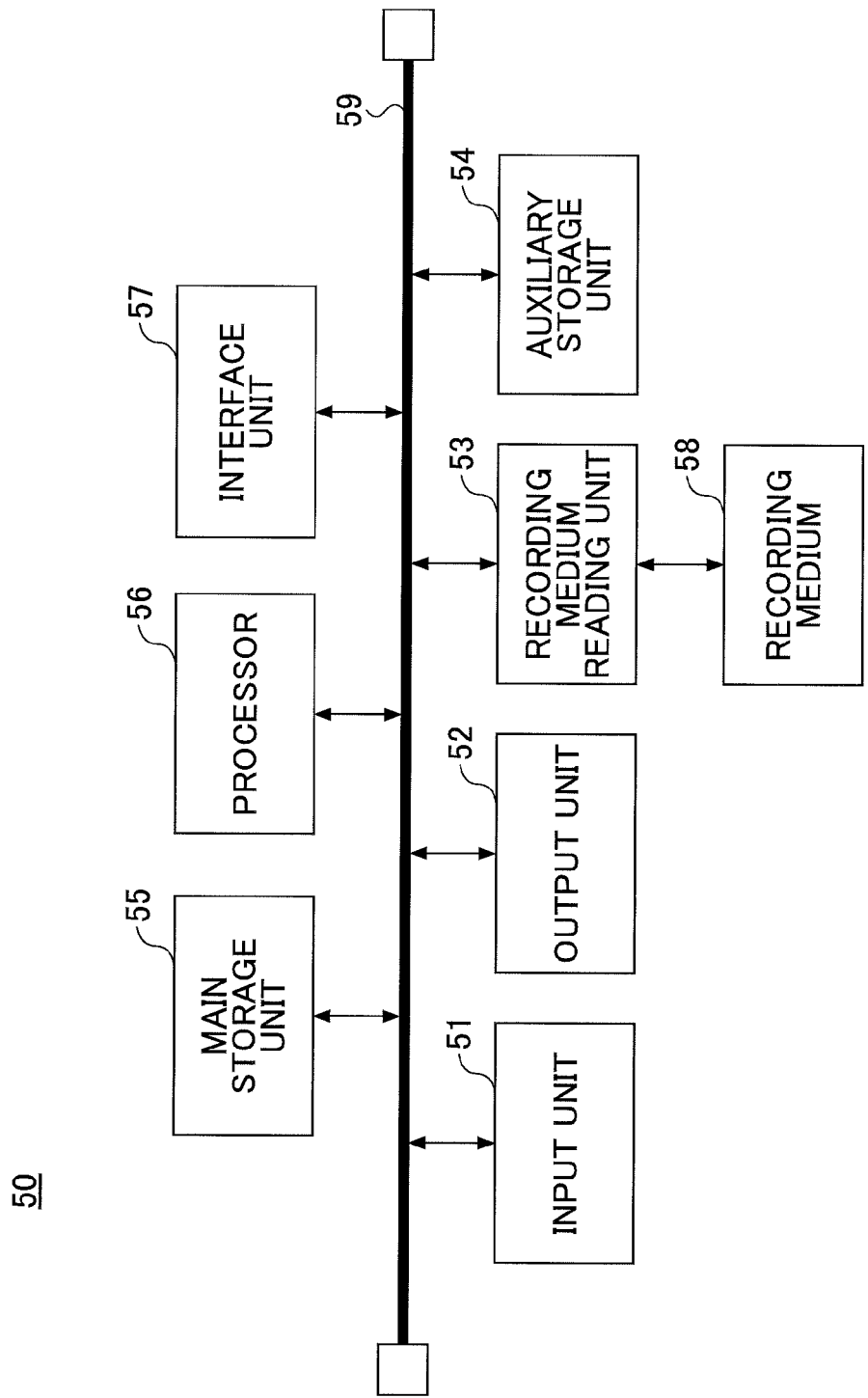
FIG. 2 is a hardware configuration diagram showing one example of a personal computer (PC)

The client control PC 11 of the end user environment 1 is realized by a PC having a hardware configuration shown in FIG. 2, for example. FIG. 2 is a hardware configuration diagram showing one example of a PC 50. The PC 50 shown in FIG. 2 includes an input unit 51, an output unit 52, a recording medium reading unit 53, an auxiliary (secondary) storage unit 54, a main storage unit (memory) 55, a processor 56 and an interface unit 57, which are mutually connected using a bus 59.

The input unit 51 includes, for example, a keyboard, a mouse and so forth. The input unit 51 is used for inputting various signals. The output unit 52 includes, for example, a display unit or the like. The output unit 52 is used to display various windows (screen pages), various data, and so forth. The interface unit 57 includes, for example, a modem, a LAN card, and so forth. The interface unit 57 is used for connecting with the network 3.

The print job editing application loaded in the client PC 11 is at least one or more of various programs that control the PC 50. The print job editing application is provided through, for example, delivery of a recording medium 58, downloading from the network 3, or the like.

As the recording medium 58, any one of various types of recording media such as recording media, storing information optically, electrically, or magnetically, such as a CD-ROM, a flexible disk, a magneto-optical disk and so forth, and semiconductor memories, storing information electrically, such as a ROM, a flash memory and so forth, can be used.

When the recording medium 58 storing the print job editing application is set in the recording medium reading unit 53, the print job editing application is installed in the auxiliary storage unit 54 via the recording medium reading unit 53. The print job editing application downloaded from the network 3 or the like is installed in the auxiliary storage unit 54 via the interface unit 57. The auxiliary storage unit 54 stores the installed print job editing application, necessary files, data, and so forth.

The main storage unit 55 reads the print job editing application from the auxiliary storage unit 54, and stores it, when starting up the print job editing application. Then, the processor 56 realizes various sorts of processing described later according to the print job editing application stored in the main storage unit 55.

Similarly, the PC server 21 of the process control part 20 is realized by a PC such as that shown in FIG. 2, for example. A processor 56 of the PC server 21 realizes various sorts of process control processing according to a process control program stored in a main storage unit 55.

<Software Configuration>

Figure 3:
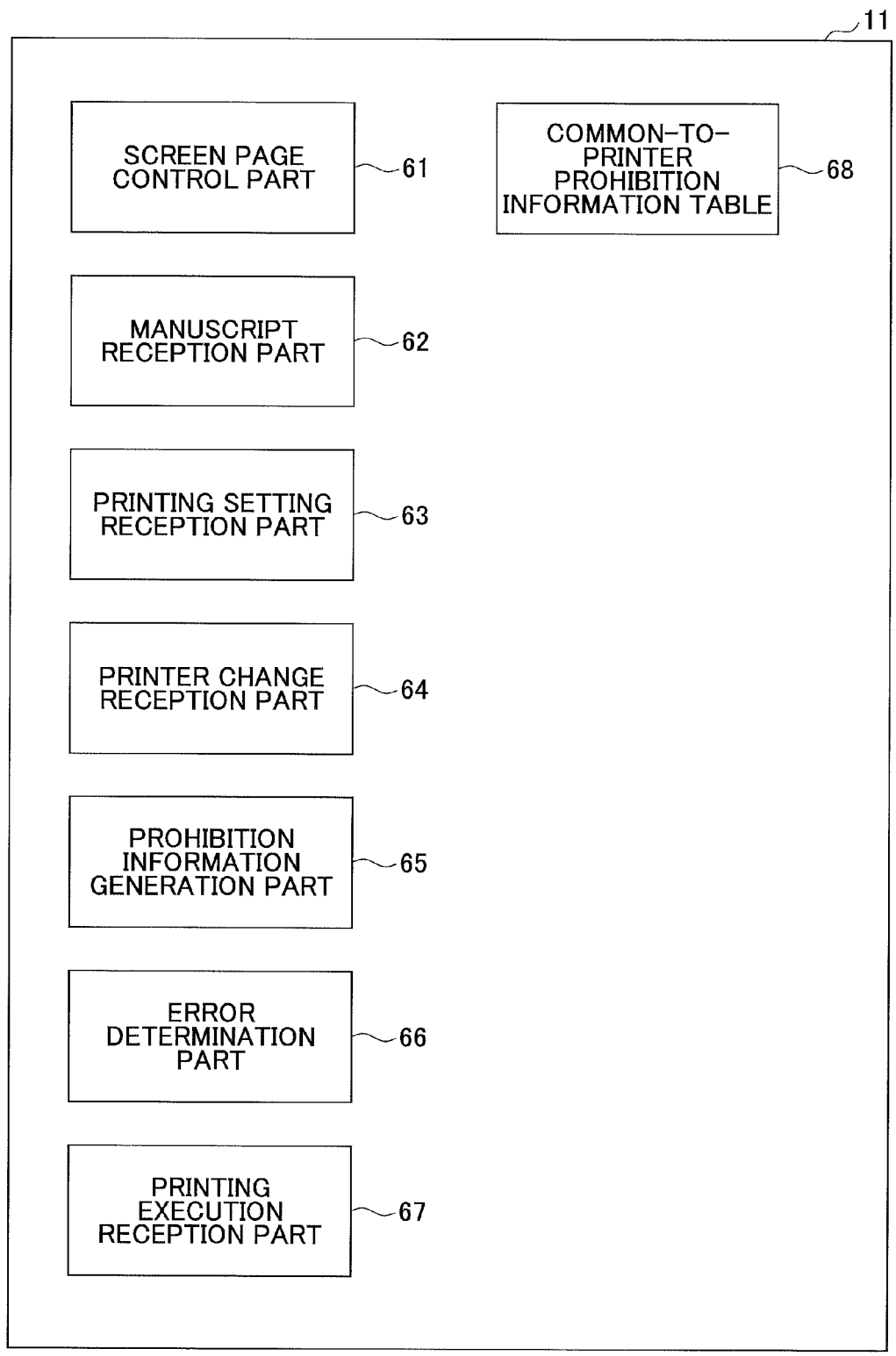
FIG. 3 is a processing block diagram showing one example a client PC shown in FIG. 1.

The client PC 11 of the end user environment 1 is realized by processing blocks shown in FIG. 3, for example. FIG. 3 is a processing block diagram showing one example of the client PC 11 shown in FIG. 1. In the client PC 11, the print job editing application is loaded. By executing the print job editing application, the client PC 11 functions as a screen page control part 61, a manuscript reception part 62, a printing setting reception part 63, a printer change reception part 64, a prohibition information generation part 65, an error determination part 66, a printing execution reception part 67 and a common-to-printer prohibition information table 68.

The screen page control part 61 carries out control of screen pages for user interfaces described later. The manuscript reception part 62 receives a manuscript for a print job from an operator via a user interface (UI). The printing setting reception part 63 receives printing settings from an operator via the UI. The printer change reception part 64 receives a change of a designation of the printer apparatus 31 from an operator via the UI. The prohibition information generation part 65 generates prohibition information (indicating prohibited or unavailable functions or combinations of functions) as described later.

The error determination part 66 determines a function (a function that becomes invalid), which has been set but becomes unavailable because of a change of a designation of the printer apparatus 31, as an erroneous function. As described later, the error determination part 66 displays an erroneous function list on the UI (see FIG. 7).

The operator reads the erroneous function list displayed on the UI, and can select a cancellation of a printing setting of an erroneous function, a cancellation of a change of a designation of the printer apparatus 31, or the like, using the UI. The error determination part 66 responds to the cancellation of the printing setting of the erroneous function or the cancellation of the change of the designation of the printer apparatus 31, using the UI, to cancel the printing setting of the erroneous function or cancel the change of the designation of the printer apparatus 31.

The printing execution reception part 67 receives, via the UI, an instruction to carry out printing from the operator. In response to the reception of the instruction to carry out printing from the operator via the UI, the printing execution reception part 67 transmits the print job to the process control part 20 of the POD printing system environment 2.

The common-to-printer prohibition information table 68 stores logical prohibition information that is defined individually by the print job editing application. It is noted that the details of the logical prohibition information will be described later.

<UI>

For the purpose that readers can easily understand the first embodiment of the present invention, a basic flow of processing of the client PC 11 will be described using the UI. It is noted that according to the first embodiment, it is assumed that the two printer apparatuses (including the printers A and B) have been registered. Further, it is assumed that the printer A can use a stapling function (i.e., the stapling function is available in the printer A) but the printer B cannot use a stapling function (i.e., the stapling function is unavailable in the printer B).

<<UI Receiving Manuscript of Print Job>>

Figure 4:
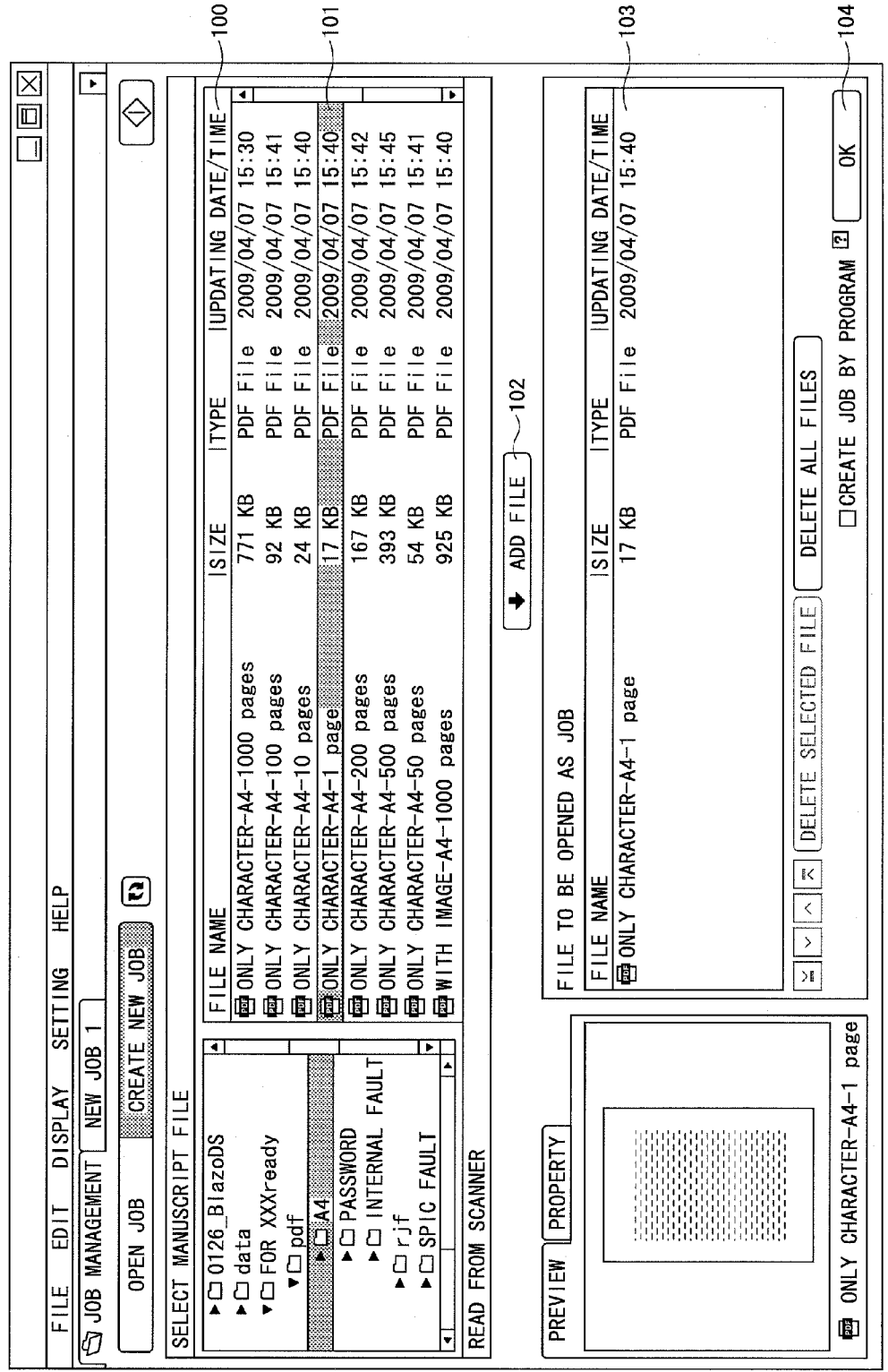
FIG. 4 shows an image of one example of a UI that receives a manuscript of a new print job.

FIG. 4 shows an image of one example of the UI that receives a manuscript of a new job. Here, it is assumed that the operator intends to input a file 101 as a manuscript. Using the UI of FIG. 4, the operator selects the file 101 to be input as a manuscript from a file list 100, and then, presses a button 102. The manuscript reception part 62 displays the file 101 selected by the operator from the file list 100 on the UI as a file 103 to be opened as the print job. Thus, the operator can select the file 103 to be opened as the print job using the UI of FIG. 4.

After that, by pressing a button 104, the operator can give an instruction to create the print job of the file 103. In response to receiving the instruction to create the print job from the operator, the manuscript reception part 62 opens the file 103 as the print job.

At this time, the client PC 11 obtains information (function information) indicating functions of the printer apparatus 31 that is set in the print job editing application as a [normally used printer] and functional prohibition information of the printer apparatus 31 that is set as the [normally used printer]. It is noted that the information indicating the functions of the printer apparatus 31 and the logical prohibition information of the printer apparatus 31 to be thus obtained may be information that the operator previously has set in the client PC 11 or the like, or information that is currently obtained from the printer apparatus 31.

<<UI Receiving Printing Settings for Print Job>>

Figure 5:
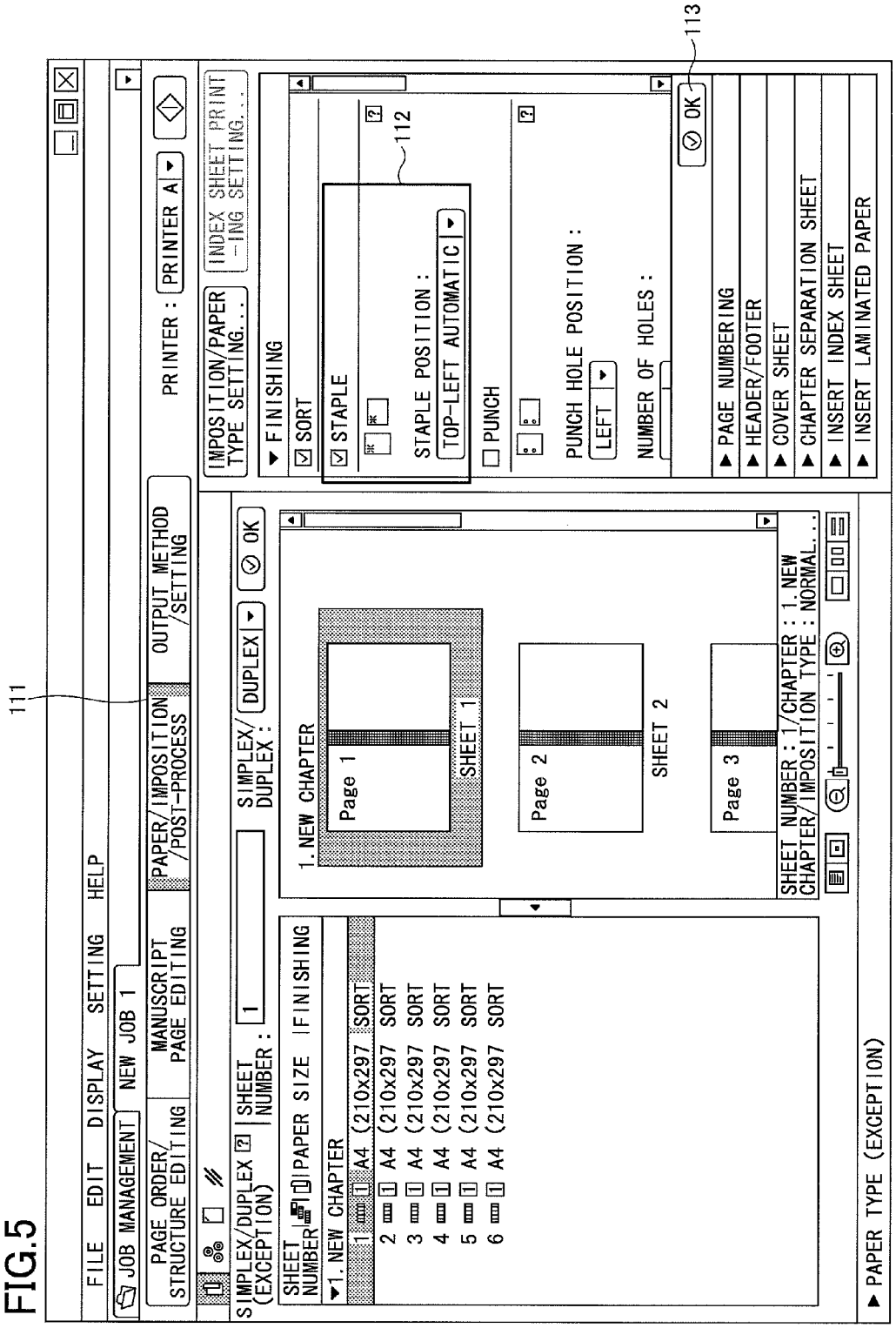
FIG. 5 shows an image of one example of a UI that receives printing settings for a new print job.

Further, FIG. 5 shows an image of one example of the UI that receives printing settings for a new job. The UI of FIG. 5 shows an example of setting stapling as a printing setting concerning a function of the printer apparatus 31.

The operator can cause the UI of FIG. 5 to be displayed by selecting a [paper/imposition/post-process] tab after pressing a button 104 on the UI of FIG. 4. The operator can set stapling by setting stapling using a stapling setting field 112 included in the UI of FIG. 5, and pressing a button 113. The printing setting reception part 63 reflects the setting of stapling (function) that has been thus set by the operator using the stapling setting field 112, in the print job.

<<UI Receiving Change of Designation of Printer Apparatus>>

Figure 6:
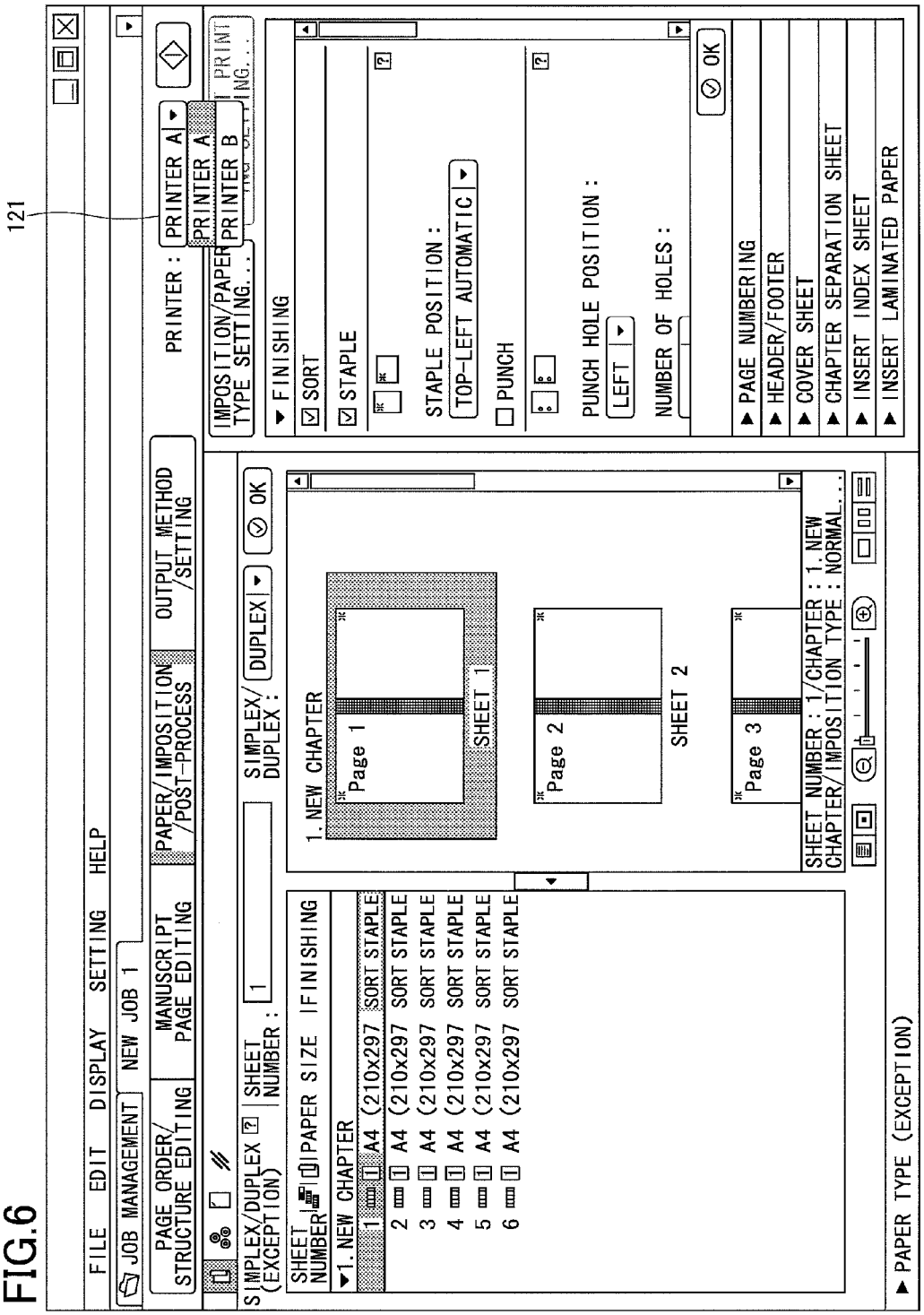
FIG. 6 shows an image of one example of a UI that receives a change of a designation of a printer apparatus.

FIG. 6 shows an image of one example of a UI that receives a change of a designation of a printer apparatus. Using the UI of FIG. 6, the operator can give an instruction to change the designation of the printer A to the printer B using a printer selection field 121 on the UI of FIG. 6. Hereinafter, it is assumed that the operator has given the instruction to change the designation of the printer A to the printer B.

The printer change reception part 64 receives the instruction to change the designation of the printer A to the printer B given by the operator. As described above, it is assumed that the printer A can use the stapling function but the printer B cannot use the stapling function.

When the printer change reception part 64 has received the instruction to change the designation of the printer apparatus 31 given by the operator, the prohibition information generation part 65 generates prohibition information as described later. The prohibition information includes, as one example of the function information, "printer B: stapling function unavailable". Since the printer B thus cannot use the stapling function, the error determination part 66 determines that the stapling function becomes unavailable because of the change of the designation from the printer A to the printer B.

Figure 7:
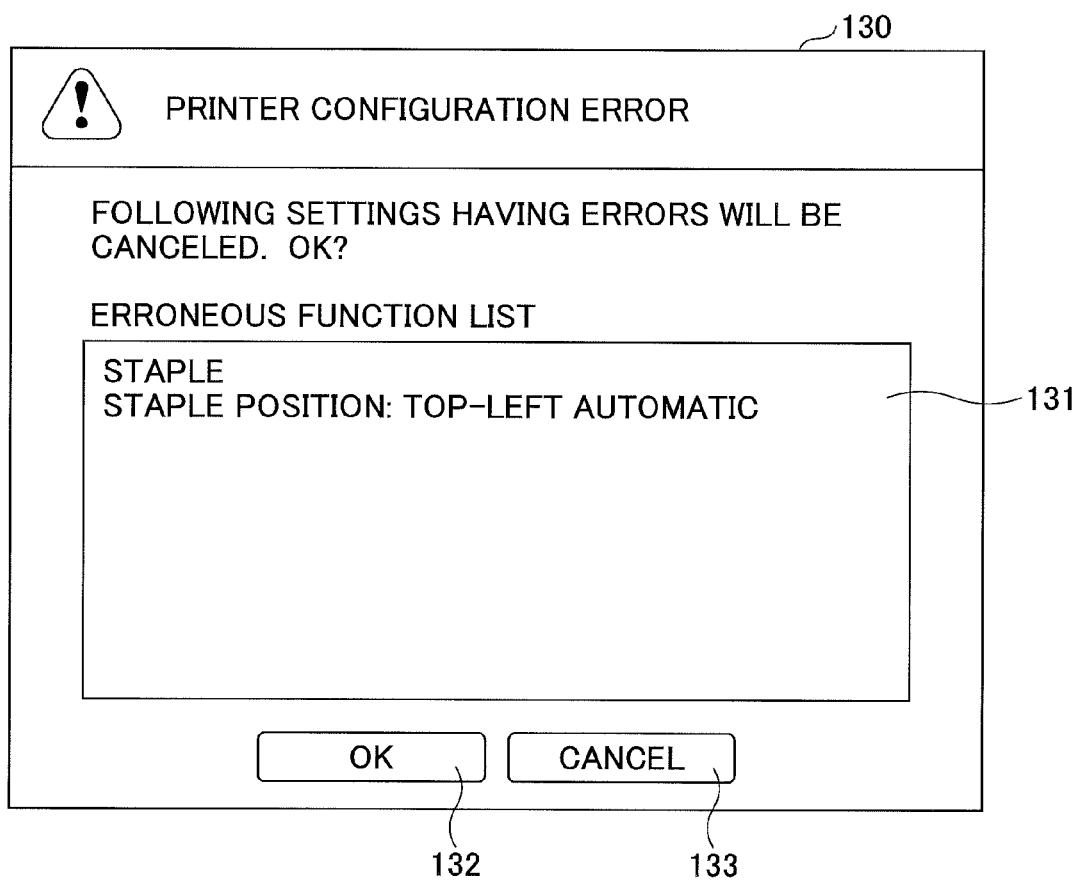
FIG. 7 shows an image of one example of a UI that displays an error.

The error determination part 66 displays an error screen page 130 such as that shown in FIG. 7. FIG. 7 shows an image of one example of the UI that displays an error. In the error screen page 130 of FIG. 7, the stapling function that becomes unavailable as a result of the change into the printer B is displayed in an erroneous function list 131.

The operator can give an instruction to cancel the stapling function displayed in the erroneous function list 131 by pressing an [OK] button 132 on the error screen page 130. On the other hand, the operator can give an instruction to cancel the change into the printer B by pressing a [cancel] button 133 on the error screen page 130.

When the [OK] button 132 on the error screen page 130 has been pressed by the operator, the error determination part 66 reflects the cancellation of the stapling function in the print job. On the other hand, when the [cancel] button 133 on the error screen page 130 has been pressed by the operator, the error determination part 66 cancels the change to the printer B. In this case, since the designation of the printer A that can use the stapling function is kept unchanged consequently, the error determination part 66 does not cancel the stapling function.

<<UI After Cancellation of Erroneous Function>>

Figure 8:
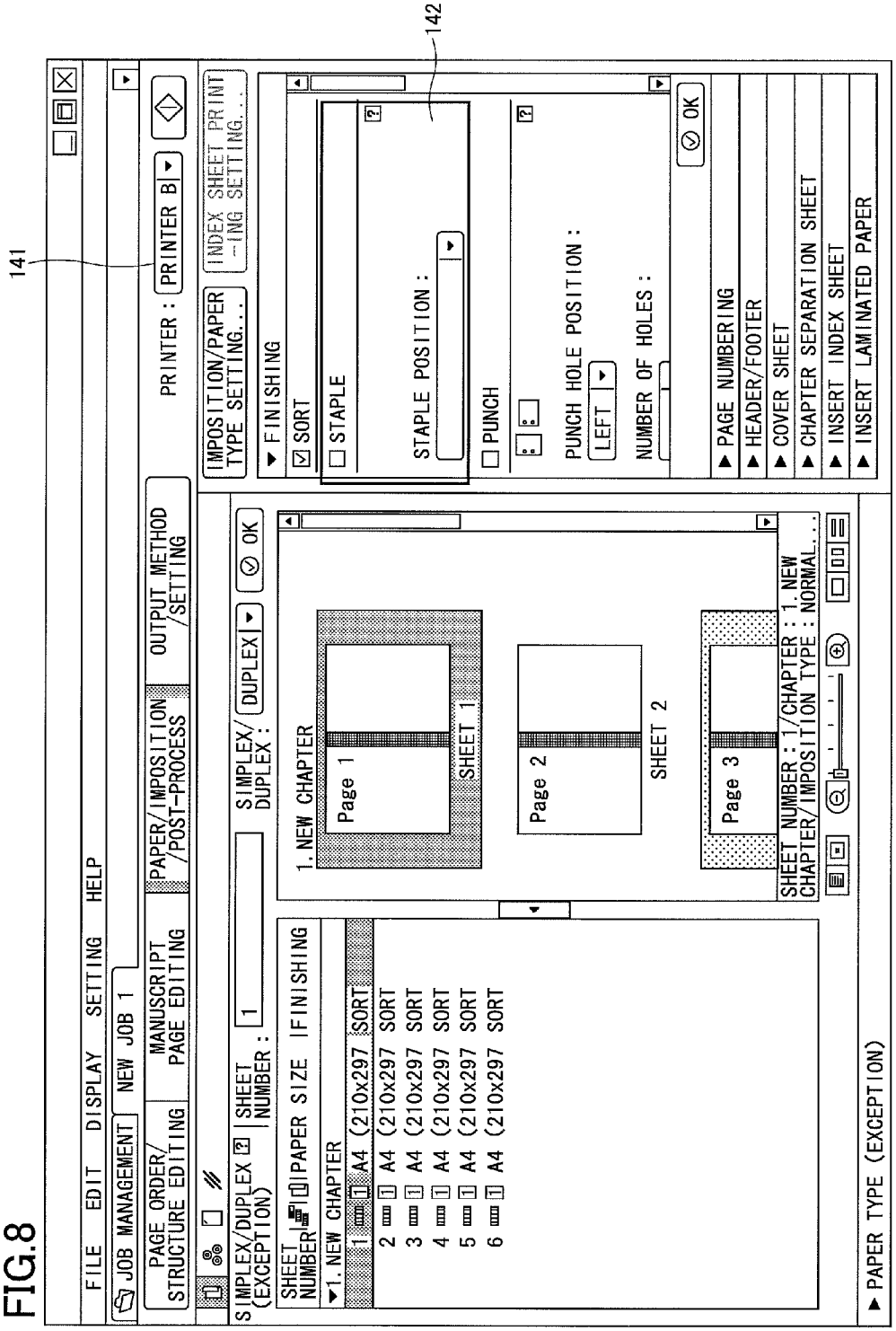
FIG. 8 shows an image of one example of a UI after an erroneous function is canceled.

FIG. 8 shows an image of one example of the UI after an erroneous function is canceled. When the [OK] button 132 on the error screen 130 of FIG. 7 has been pressed and the stapling function has been cancelled, the printing setting reception part 63 displays the UI of FIG. 8. In the UI of FIG. 8, a printer selection field 141 has been changed from the printer A to the printer B, and the setting of the stapling function has been cancelled in a stapling setting field 142. Further, in the UI of FIG. 8, since the printer B cannot use the stapling function, the stapling setting field 142 is displayed in a grayed-out mode to indicate that the operator is not allowed to set the stapling function.

<<UI After Cancellation of Change into Printer B>>

Figure 9:
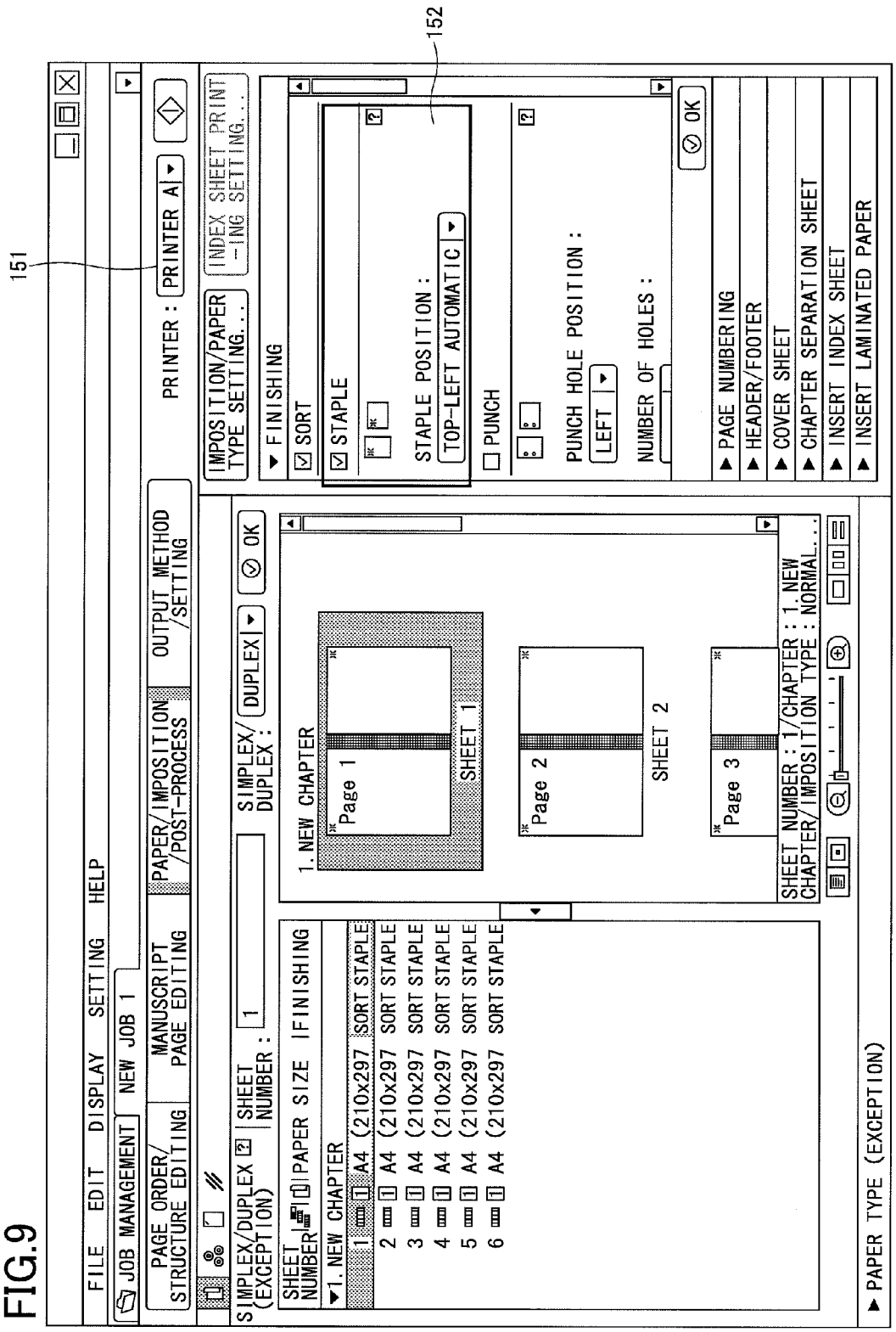
FIG. 9 shows an image of one example of a UI after a change to a printer B is canceled.

FIG. 9 shows an image of one example of the UI after the change to the printer B is canceled. When the [cancel] button 133 on the error screen page 130 of FIG. 7 has been pressed and thus the change to the printer B has been cancelled, the printing setting reception part 63 displays the UI of FIG. 9. In the UI of FIG. 9, a printer selection field 151 is kept unchanged as the original "printer A", and also, the stapling function is not cancelled in a stapling setting field 152.

<Procedure of Processing>

Next, the basic flow of processing of the client PC 11, having been described using FIGS. 4 through 9, will now be described using a flowchart.

<<Basic Processing of Client PC>>

Figure 10:
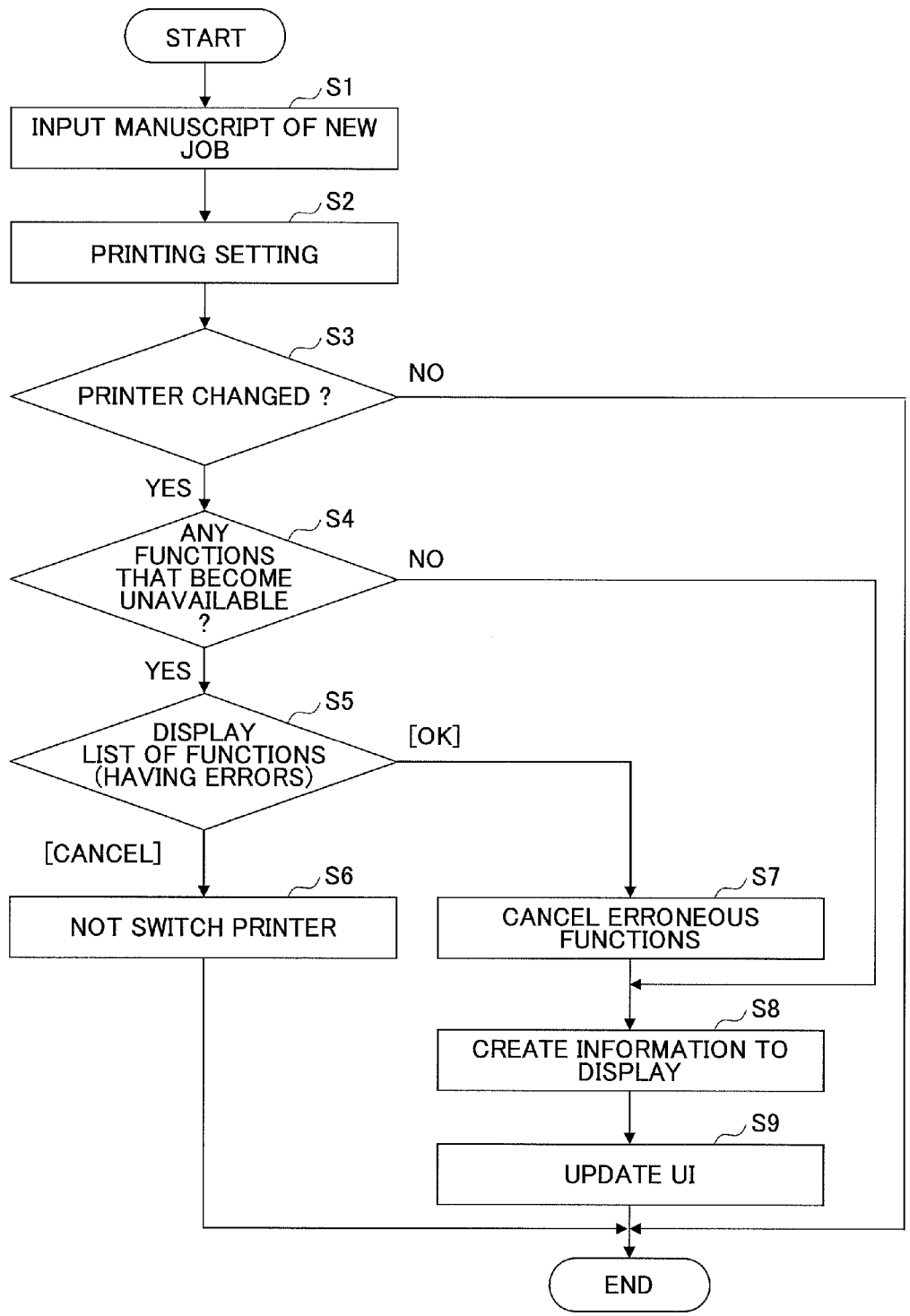
FIG. 10 is a flowchart of one example of a basic processing procedure of the client PC.

FIG. 10 is a flowchart of one example of a basic processing procedure of the client PC 11.

In step S1, the screen page control part 61 displays the UI such as that shown in FIG. 4 on the output unit 52, for example. As described above, the operator can select the file 103 to be opened as the print job using the UI of FIG. 4. After that, the operator can give an instruction to create the print job of the file 103 by pressing the button 104. Thus, the manuscript reception part 62 receives the manuscript of the print job from the operator via the UI such as that shown in FIG. 4.

After receiving the manuscript of the print job from the operator, the screen page control part 61 displays the UI such as that shown in FIG. 5 on the output unit 52, in step S2. As described above, the operator can carry out printing settings for the print job using the UI of FIG. 5. The printing setting reception part 63 receives the printing settings for the print job from the operator via the UI such as that shown in FIG. 5.

In step S3, the printer change reception part 64 displays the UI such as that shown in FIG. 6 on the output unit 52. As described above, the operator can give an instruction to change the designation of the printer apparatus 31 using the UI of FIG. 6. The printer change reception part 64 determines whether having received a change of the designation of the printer apparatus 31 from the operator, in other words, whether the printer apparatus 31 has been switched. The printer change reception part 64 receives a change of the designation of the printer apparatus 31, if any, from the operator via the UI such as that shown in FIG. 6.

When no change of the designation of the printer apparatus 31 has been received from the operator (step S3 NO), the processing of FIG. 10 is finished. When the printer change reception part 64 has received a change of the designation of the printed apparatus 31 from the operator (step S3 YES), the prohibition information generation part 65 generates prohibition information as described later. After that, in step S4, the error determination part 66 uses the generated prohibition information, and determines whether there are functions that become unavailable because of the change (step S3 YES) of the designation of the printer apparatus 31. Details thereof will be described later.

When there are no functions that become unavailable because of the change of the designation of the printer apparatus 31 (step S4 NO), the printing setting reception part 63 generates information for adapting the printer selection field 121 to the change of the designation of the printer apparatus 31 (from the printer A to the printer B, in the above-mentioned example), in step S8. Then, in step S9, the screen page control part 61 updates the UI in which the printer selection field 121 has been adapted to the change of the designation of the printer apparatus 31 (from the printer A to the printer B, in the above-mentioned example).

When there are functions that become unavailable because of the change of the designation of the printer apparatus 31 (step S4 YES), the error determination part 66 displays the error screen page 130 such as that shown in FIG. 7, in step S5. The error determination part 66 determines functions, which become unavailable because of the change of the designation of the printer apparatus 31, as erroneous functions, and displays the erroneous function list 131 on the UI.

When a cancellation of the change of the designation of the printer apparatus 31 has been selected from the error screen page 130 such as that shown in FIG. 7 (step S5 [cancel]), the printing setting reception part 63 displays the UI such as that shown in FIG. 9, in step S6. As shown in FIG. 9, the UI is displayed in which the original printer A is displayed as unchanged consequently in the printer selection field 151.

On the other hand, when the [OK] button 132 indicating a cancellation of the printing setting of the erroneous function has been selected from the error screen page 130 such as that shown in FIG. 7 (step S5 [OK]), the error determination part 66 reflects the cancellation of the printing setting of the erroneous function in the print job, in step S7. Further, in step S8, the printing setting reception part 63 creates information for displaying the UI such as that shown in FIG. 8. For example, in the example of the UI of FIG. 8, the information is created for changing the printer selection field 141 to the printer B, and changing the stapling setting field 142 to be displayed in the grayed-out mode as mentioned above. Then, in step S9, the screen page control part 61 uses the thus-created information and updates the UI to the UI of FIG. 8.

<<Details of Step S4>>

Figure 11:
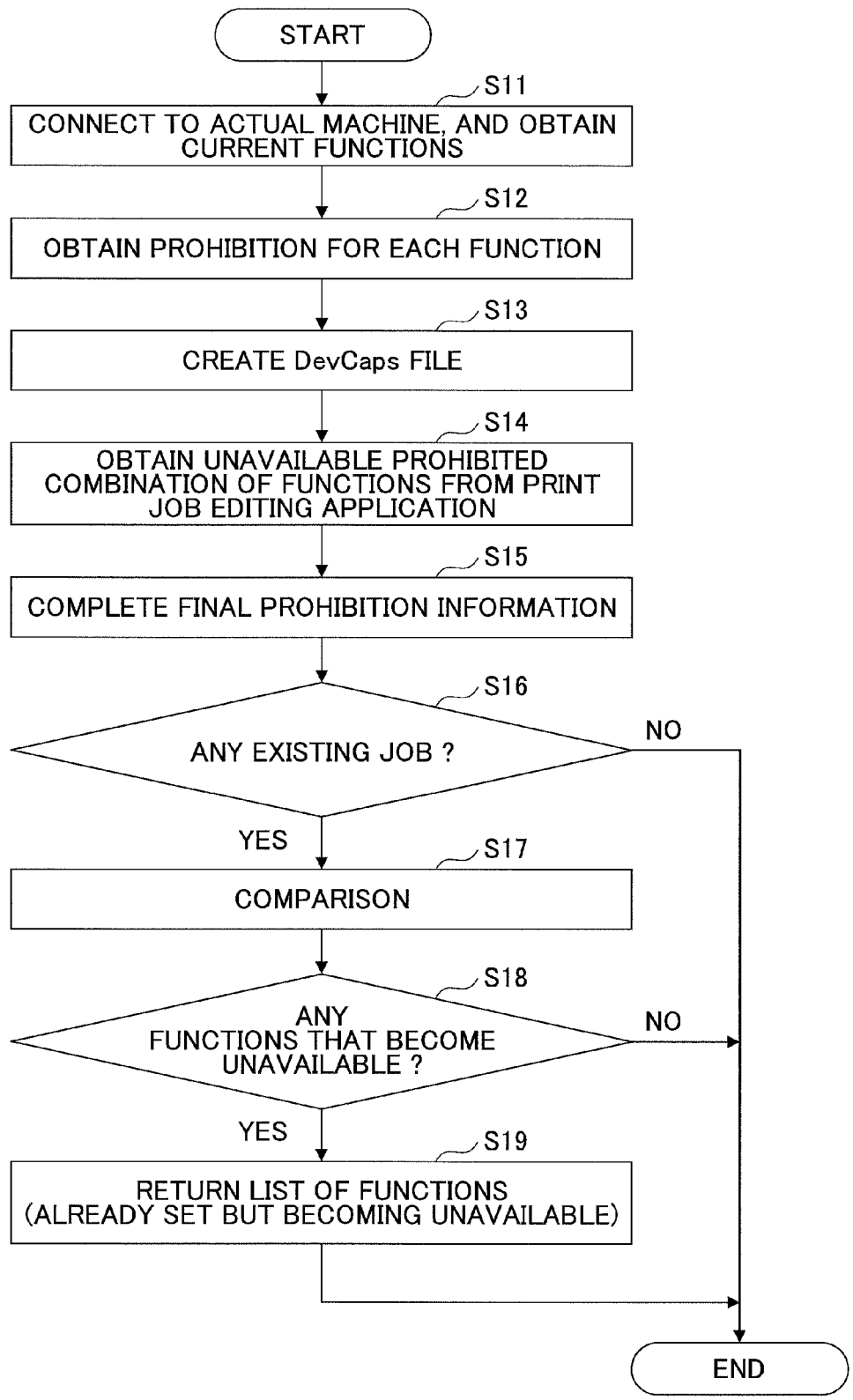
FIG. 11 is a flowchart of one example showing details of prohibition determination.

Details of step S4 in FIG. 10 will now be described. After receiving the change of the designation of the printer apparatus 31 from the operator (step S3 YES), the prohibition information generation part 65 starts processing of a flowchart such as that of FIG. 11. FIG. 11 is a flowchart of one example showing details of the prohibition determination.

In step S11 of FIG. 11, the prohibition information generation part 65 connects with the printer apparatus 31 as an actual machine, for example, and obtains current function information indicating the current functions of the printer apparatus 31. The function information to be thus obtained is information indicating whether the printer apparatus 31 has a duplex printing function, a stapling function, a punching function, and so forth. In other words, the function information is information indicating functions that the printer apparatus 31 has.

In step S12, the prohibition information generation part 65 obtains, from the printer apparatus 31, prohibition information (functional prohibition information) for each function that is indicated by the function information obtained in step S11. The functional prohibition information includes, for example, information indicating that it is not possible (it is prohibited) to designate the stapling function and the punching function at the same time (because of the structure of the printer apparatus 31, for example). Thus, a certain combination(s) of functions is(are) prohibited according to the functional prohibition information. In other words, the functional prohibition information indicates a functionally prohibited combination(s) of functions.

In step S13, the prohibition information generation part 65 uses the function information obtained in step S11 and the functional prohibition information obtained in step S12, and creates a DevCaps file (described later).

In step S14, the prohibition information generation part 65 obtains, from the print job editing application, information (logical prohibition information) of a prohibited combination(s) that is(are) unavailable (is(are) not allowed to be designated) according to the print job editing application. The logical prohibition information to be thus obtained includes, for example, information indicating that leftward opening and right stapling cannot be designated at the same time. The logical prohibition information may further include prohibition of a combination of N-up imposition and center stapling, a combination of imposition of (weekly) magazine printing and punching, and/or the like. The logical prohibition information is previously set in the print job editing application as printing conditions that are logically prohibited because of relationships with imposition or the like. Also in this case, a certain combination(s) of functions is(are) prohibited according to the logical prohibition information. In other words, the logical prohibition information indicates a logically prohibited combination(s) of functions.

In step S15, the prohibition information generation part 65 merges the function information obtained in step S11, the functional prohibition information obtained in step S12 and the logical prohibition information obtained in step S14, and completes the final prohibition information.

In step S16, the error determination part 66 determines whether there is an existing print job. In a case where there is no existing print job (step S16 NO), the error determination part 66 finishes the processing of FIG. 11, and the processing then proceeds to step S8 in FIG. 10. In a case where there is an existing print job (step S16 YES), the error determination part 66 compares the printing settings in the existing print job with the final prohibition information that has been completed in step S15, in step S17.

Then, the error determination part 66 determines, based on the result of the comparison in step S17, whether there are functions that become unavailable because of the change (step S3 YES) of the designation of the printer apparatus 31, in step S18. For example, in a case of the print job using the stapling function, it is determined that there is the function that becomes unavailable because of the change of the designation of the printer apparatus 31, when the designation of the printer apparatus 31 has been changed (step S3 YES) from the printer A that can use the stapling function to the printer B that cannot use the stapling function. In contrast thereto, when there are no functions that become unavailable because of the change (step S3 YES) of the designation of the printer apparatus 31 (step S18 NO), the error determination part 66 finishes the processing of FIG. 11, and the processing then proceeds to step S8 in FIG. 10.

When there are functions that become unavailable because of the change of the designation of the printer apparatus 31 (step S18 YES), the error determination part 66 determines the functions that become unavailable because of the change of the designation of the printer apparatus 31 as erroneous functions, in step S19. The processing then proceeds to step S5 in FIG. 10, and the error determination part 66 displays the erroneous function list on the UI.

<<Details of Step S7>>

Figure 12:
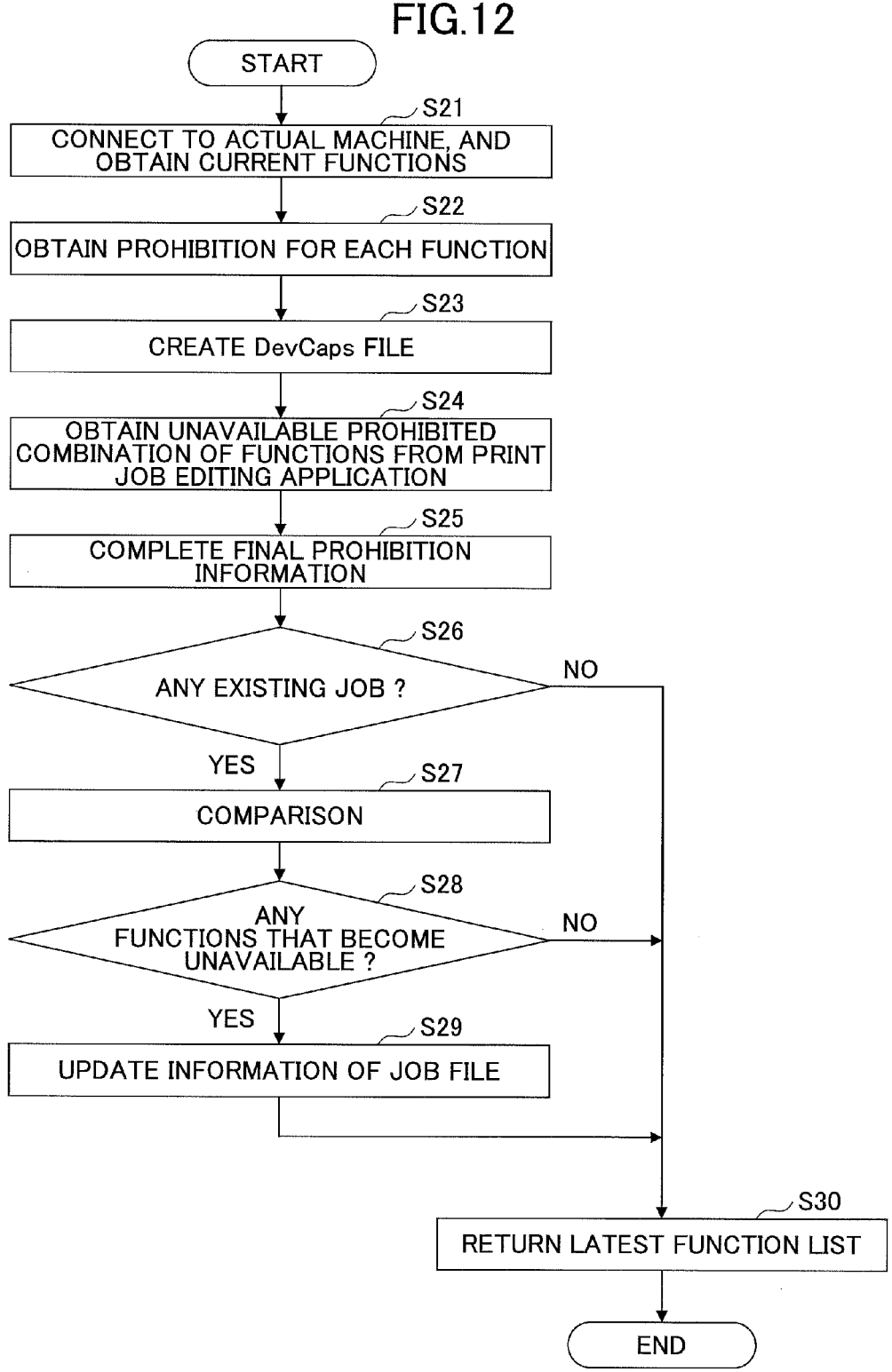
FIG. 12 is a flowchart of another example showing details of prohibition determination.

Details of step S7 in FIG. 10 will now be described. When receiving the instruction of [OK] from the operator in step S5, the prohibition information generation part 65 starts processing of a flowchart such as that shown in FIG. 12. FIG. 12 is a flowchart of another example showing the details of the prohibition determination. The processing of steps S21 through S28 is approximately the same as that of steps S11 through S18 of FIG. 11 described above. Therefore, duplicate description therefor will be omitted.

However, obtaining the function information in step S11 and obtaining the functional prohibition information in step S12 may be obtaining only information concerning the functions that have been already set in the print job for the purpose of improving the processing speed. In contrast thereto, steps S21, S22 in FIG. 12 are different from step S11, S12 in FIG. 11 in that the information concerning all of the functions of the printer apparatus 31 is obtained in steps S21, S22 in FIG. 12. This is because in steps S21, S22 in FIG. 12, which are carried out in step S7 after the switching of the printer apparatus 31 has been received in step S3 and the switching (to the printer B, in the above-mentioned example) has been confirmed by the operator (step S5 [OK]), the function list (including all of the functions) for the switched printer apparatus 31 (the printer B, in the above-mentioned example) should be displayed in step S9. Therefore, if the information concerning all of the functions of the printer apparatus 31 (having been thus switched) is obtained in steps S11, S12 and is stored, steps S21 through S25 in FIG. 12 can be omitted.

The error determination part 66 determines, based on the result of the comparison in step S27, whether there are functions that become unavailable because of the change of the designation of the printer apparatus 31, in step S28. When there are functions that become unavailable because of the change of the designation of the printer apparatus 31 (step S28 YES), the error determination part 66 cancels the functions that become unavailable because of the change of the designation of the printer apparatus 31 from the print job in step S29, and then, carries out step S30. When there are no functions that become unavailable because of the change of the designation of the printer apparatus 31 (step S28 NO), the error determination part 66 carries out step S30. Then, in step S30, the error determination part 66 returns the new function list (for the printer B, in the above-mentioned example) to the printing setting reception part 63. Further, as shown in FIG. 12, step S30 is carried out also in a case where there is no existing print job (step S26 NO).

It is noted that in step S29, instead of the error determination part 66 cancelling, in a lump, the functions that become unavailable because of the change of the designation of the printer apparatus 31 from the print job, the error determination part 66 may cancel the corresponding functions, function by function, as a result of being selected by the operator via the UI.

Further, the above-mentioned determination for determining the erroneous functions as to the functions that have been set in the job ticket (print job) may be carried out, not only at a time of changing the designation of the printer apparatus 31 (step S3, in FIG. 10, YES), but also at a time of receiving the print job and/or at a time of carrying out printing, using the function information, the functional prohibition information and the logical prohibition information.

<<UI for Operator to Select Cancellation of Functions Becoming Unavailable>>

Figure 13:
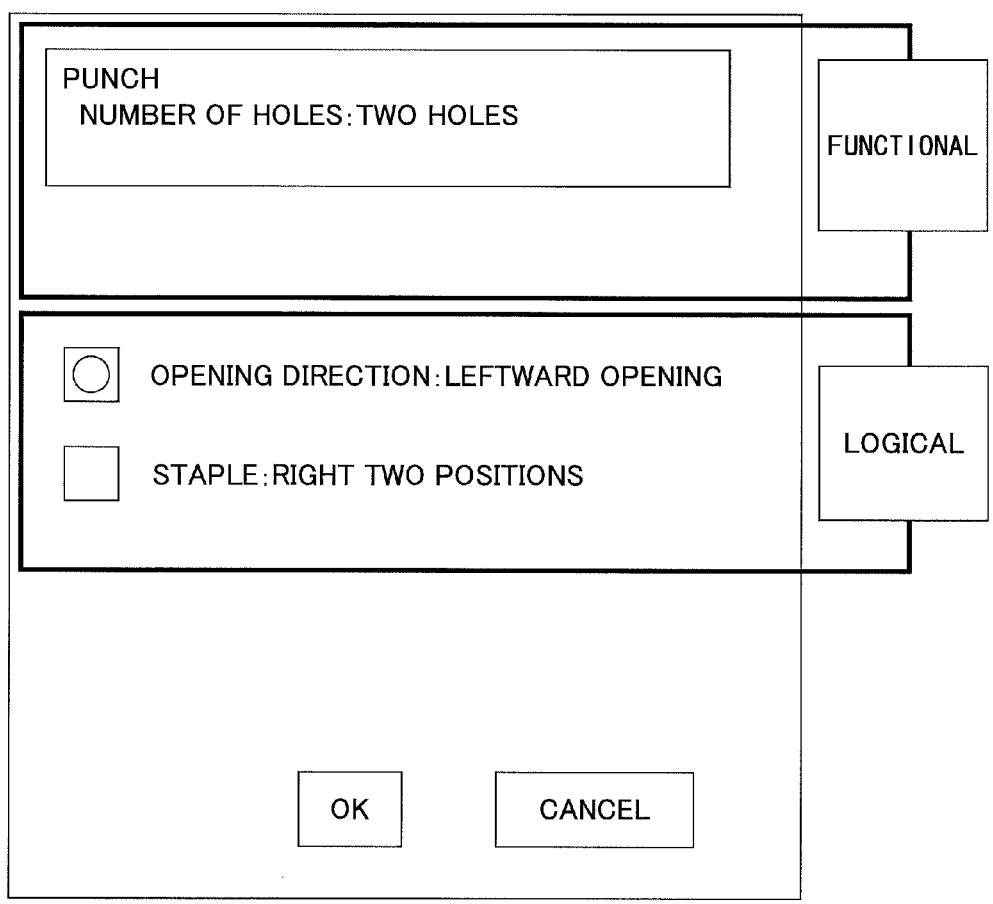
FIG. 13 shows an image of one example of a UI to be used by an operator to select a cancellation of functions that become unavailable.

FIG. 13 shows an image of one example of the UI to be used by an operator to select a cancellation of functions that become unavailable. For example, the error determination part 66 displays the UI of FIG. 13. The UI of FIG. 13 displays in such a manner that the functions that become unavailable are separated into those that become unavailable according to the functional prohibition information and those that become unavailable according to the logical prohibition information. In the UI of FIG. 13, check boxes are provided with which the operator selects which one of the functions that become unavailable according to the logical prohibition information is to be canceled.

According to the first embodiment of the present invention, as a prerequisite, the function information and the functional prohibition information of the printer apparatus 31 is stored in the DevCaps file. Further, in the print job editing application, the prohibition information (logical prohibition information) that is common to the printer apparatuses 31 is stored.

As described above, as an example of the function information of the printer apparatus 31, information indicating whether the printer apparatus 31 has the duplex printing function, the punching function, the stapling function, and so forth, for example, may be cited. As an example of the functional prohibition information, information indicating that it is not possible (it is prohibited) to designate the stapling function and the punching function at the same time (because of the structure of the printer apparatus 31, for example). Thus, a certain combination(s) of functions is(are) prohibited according to the functional prohibition information. It is noted that functional prohibition means that functions exist and can be set separately, but cannot be combined. As an example of the logical prohibition information, information indicating that leftward opening and right stapling cannot be designated at the same time. (The logical prohibition information may further include a prohibited combination(s) of N-up imposition and center stapling; imposition of (weekly) magazine printing and punching; and/or the like.) Also in this case, a certain combination(s) of functions is(are) prohibited according to the logical prohibition information. It is noted that logical prohibition means that functions exist, can be set separately, and can be combined, but the combination thereof is prohibited in the print job editing application because of relationships with imposition or the like.

The error determination part 66 displays the erroneous function list, as to the functions that are already set in the job ticket (print job), on the error screen page 130. Then, in a case where the operator presses the [OK] button 132 indicating a cancellation of the printing settings of the erroneous functions (step S5, in FIG. 10, [OK]), the error determination part 66 reflects the cancellation of the printing settings of the erroneous functions in the print job (step S7).

In contrast thereto, in a case where the operator does not press the [OK] button 132 indicating a cancellation of the printing settings of the erroneous functions (step S5, in FIG. 10, [cancel]), the error determination part 66 does not carry out the cancellation of the printing settings of all or part of the erroneous functions. Then, in a case where the error determination part 66 does not carry out a cancellation of the printing settings of all of the erroneous functions, the error determination part 66 cancels processing (changing the designation of the printer apparatus 31 (step S6, in FIG. 10), receiving the print job or carrying out the printing) that causes the above-mentioned determination of the erroneous functions. On the other hand, as another case, the error determination part 66 may cancel part of the erroneous functions depending on which one of the function information, the functional prohibition information and the logical prohibition information the determination of the erroneous functions is based on. That is, for example, in a case where all of the erroneous functions are those determined based on the function information, this means that all of the erroneous functions are not available in the printer apparatus 31. Therefore, in this case, all of the erroneous functions are to be canceled unless the processing that causes the determination of the erroneous functions is canceled. In contrast thereto, in a case where the erroneous functions are those determined based on the functional or logical prohibition information, this means that only one of each prohibited combination of the functions is to be canceled even when the processing that causes the determination of the erroneous functions is not canceled. Therefore, in this case, part of the erroneous functions is to be canceled even when the processing that causes the determination of the erroneous functions is not canceled.

<<Difference in Processing Erroneous Functions Depending on Timing>>

In the PP business, it is necessary to avoid a situation of carrying out printing in a state where functions that cannot be actually carried out (i.e., becoming unavailable according to the function information and the functional prohibition information) are set. However, functions that are prohibited in the functional prohibition information are prohibited because of the combination(s) of the functions, and therefore, any one of each inhibited combination of the functions can be separately set. Therefore, what is necessary in this case is to cancel any one of each inhibited combination of the erroneous functions. On the other hand, a combination of functions even prohibited according to the logical prohibition information should be permitted when a user requests it. Therefore, a determination as to whether the corresponding setting has been carried out intentionally is important. Therefore, depending on each one of timings of receiving the print job, changing the designation of the printer apparatus 31 and carrying out the printing, settings of functions to be canceled differ depending on which one of the function information, the functional prohibition information and the logical prohibition information the erroneous functions have been based on.

At a time of changing the designation of the printer apparatus 31 (see FIG. 14, the line of "changing designation of printer apparatus"), the operator can select settings to be canceled for the erroneous functions determined based on the functional prohibition information (see FIG. 14, the column of "functional prohibition information", i.e., "selectable"). However, the operator is not allowed (by the screen page control part 61) to press the [OK] button in a state where any combination of functions prohibited by the functional prohibition information is left as it is ("contradiction not permitted" in FIG. 14). That is, in this case, it is necessary to cancel the setting of any one of the functions of each prohibited combination.

At a time of changing the designation of the printer apparatus 31, as to the erroneous functions determined based on the function information (see FIG. 14, the column of "function information"), all of the erroneous functions determined based on the function information are to be canceled, and thus, there is no room to select one to be canceled from the erroneous functions determined based on the function information, under the control of the screen page control part 61 ("cancel all erroneous functions" in FIG. 14).

At a time of changing the designation of the printer apparatus 31, as to the erroneous functions determined based on the logical prohibition information (see FIG. 14, the column of "logical prohibition information"), since the logical prohibition information is common to the printer apparatuses 31, the logical prohibition is not considered by the screen page control part 61 ("don't care" in FIG. 14). Therefore, in this case, under the control of the screen page control part 61, the operator can leave the erroneous functions determined based on the logical prohibition information as they are.

At a time of receiving the print job (see FIG. 14, the line of "receiving print job"), the operator is allowed, under the control of the screen page control part 61, to select a setting(s) of any function(s) to be canceled ("selectable" in FIG. 14). In particular, at a time of receiving the print job, in consideration that it may become possible to finally carry out once prohibited functions by thereafter changing the designation of the printer apparatus 31, the operator is allowed, under the control of the screen page control part 61, to press the [OK] button even in a state where functions or combinations that become invalid are left as they are ("contraction permitted" in FIG. 14).

On the other hand, at a time of carrying out the printing (see FIG. 14, the line of "carrying out printing"), the operator is allowed, under the control of the screen page control part 61, to select a setting(s) of a function(s) to be canceled from the erroneous functions inhibited based on the logical prohibition information (see FIG. 14, the column of "logical prohibition information", i.e., "selectable").

At a time of carrying out the printing, as to the erroneous functions determined based on the function information and the functional prohibition information (see FIG. 14, the columns of "function information" and "functional prohibition information"), the same manners as those described above at a time of changing the designation of the printer apparatus 31 are applied. It is noted that a time of receiving the print job includes a time of opening a print job file that has been stored.

Relationship of the above-mentioned respective times of receiving the print job, changing the designation of the printer apparatus 31 and carrying out the printing with the function information, the functional prohibition information and the logical prohibition information is shown by a table such as that of FIG. 14. FIG. 14 shows a table of one example of relationships of timing of receiving a print job, timing of changing a designation of a printer apparatus and timing of carrying out printing with the function information, the functional prohibition information and the logical prohibition information.

In FIG. 14, "selectable" indicates that the operator is allowed, under the control of the screen page control part 61, to select a setting of a function to be canceled from the erroneous functions. "Contradiction permitted" indicates that the screen page control part 61 receives processing in a state where the functions or combinations that become invalid are left as they are. "Cancel all erroneous functions or cancel processing" indicates that only any one of cancelling all of the printing settings of the erroneous functions or cancelling the processing that causes the determination of the erroneous functions is received by the screen page control part 61. "Contradiction not permitted" indicates that the screen page control part 61 does not receive processing in a state where the functions or combinations that become invalid are left as they are. "Don't care" indicates that it is not necessary to cancel the erroneous functions.

Second Embodiment

A second embodiment of the present invention will now be described. Since a system configuration and a hardware configuration are the same as those of the first embodiment described above, duplicate description will be omitted.
<Software Configuration>

Figure 15:
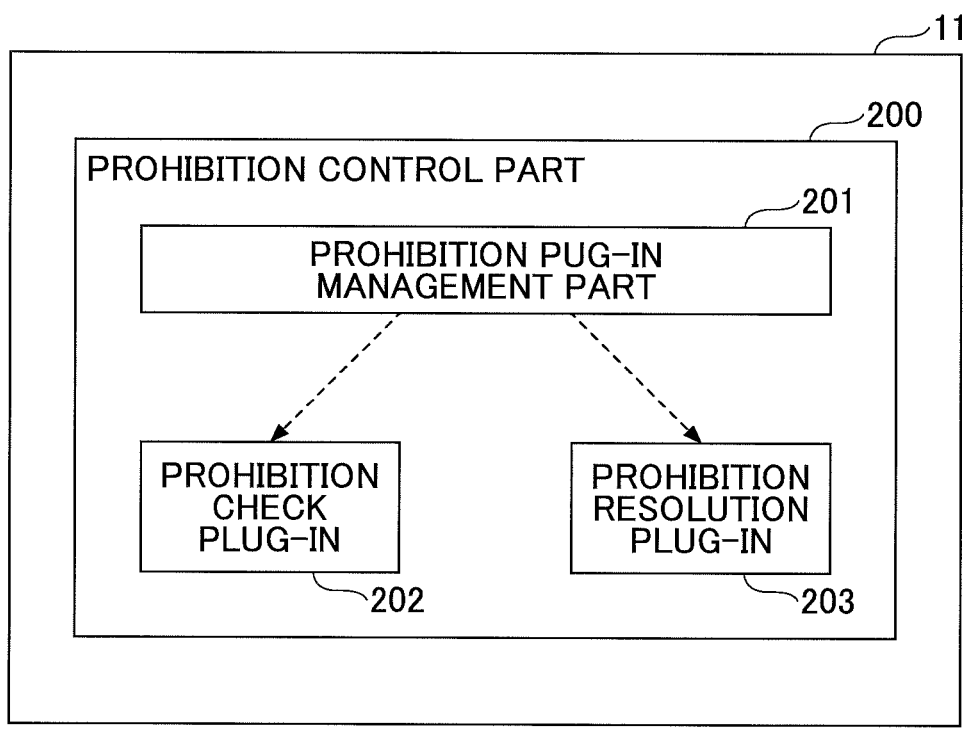
FIG. 15 is a processing block diagram of another example of the client PC shown in FIG. 1.

The software configuration of the prohibition information generation part 65 and the error determination part 66 of the client PC 11 of the end user environment 1 shown in FIG. 3, for example, can be realized by a software configuration shown in FIG. 15. FIG. 15 is a processing block diagram of another example of the client PC shown in FIG. 1. It is noted that in the software configuration shown in FIG. 3, the software configuration other than the prohibition information generation part 65 and the error determination part 66 is common to the first and second embodiments. Therefore, in FIG. 15, the parts that are the same as those of the software configuration of FIG. 3 are omitted.

According to the second embodiment, the client PC 11 has a prohibition control part 200 (see FIG. 15). The prohibition control part 200 includes a prohibition plug-in management part 201, a prohibition check plug-in 202 and a prohibition resolution plug-in 203. The prohibition control part 200 realizes prohibition control by carrying out the prohibition check plug-in 202 and the prohibition resolution plug-in 203 via the prohibition plug-in management part 201.

The prohibition plug-in management part 201 is a module that provides a function of the prohibition control using the prohibition check plug-in 202 and the prohibition resolution plug-in 203 that are subordinates of the prohibition plug-in management part 201. The prohibition plug-in management part 201 manages an execution order (sequence) of the prohibition check plug-in 202 and the prohibition resolution plug-in 203.

The prohibition check plug-in 202 provides a function of prohibition check to the prohibition plug-in management part 201. The prohibition resolution plug-in 203 provides a function of prohibition resolution to the prohibition plug-in management part 201. For example, the prohibition check plug-in 202 uses the prohibition information and provides a function of determining whether there are the erroneous functions. The prohibition resolution plug-in 203 provides a function of cancelling the printing settings of the erroneous functions.
<Procedure of Processing>

Figure 16:
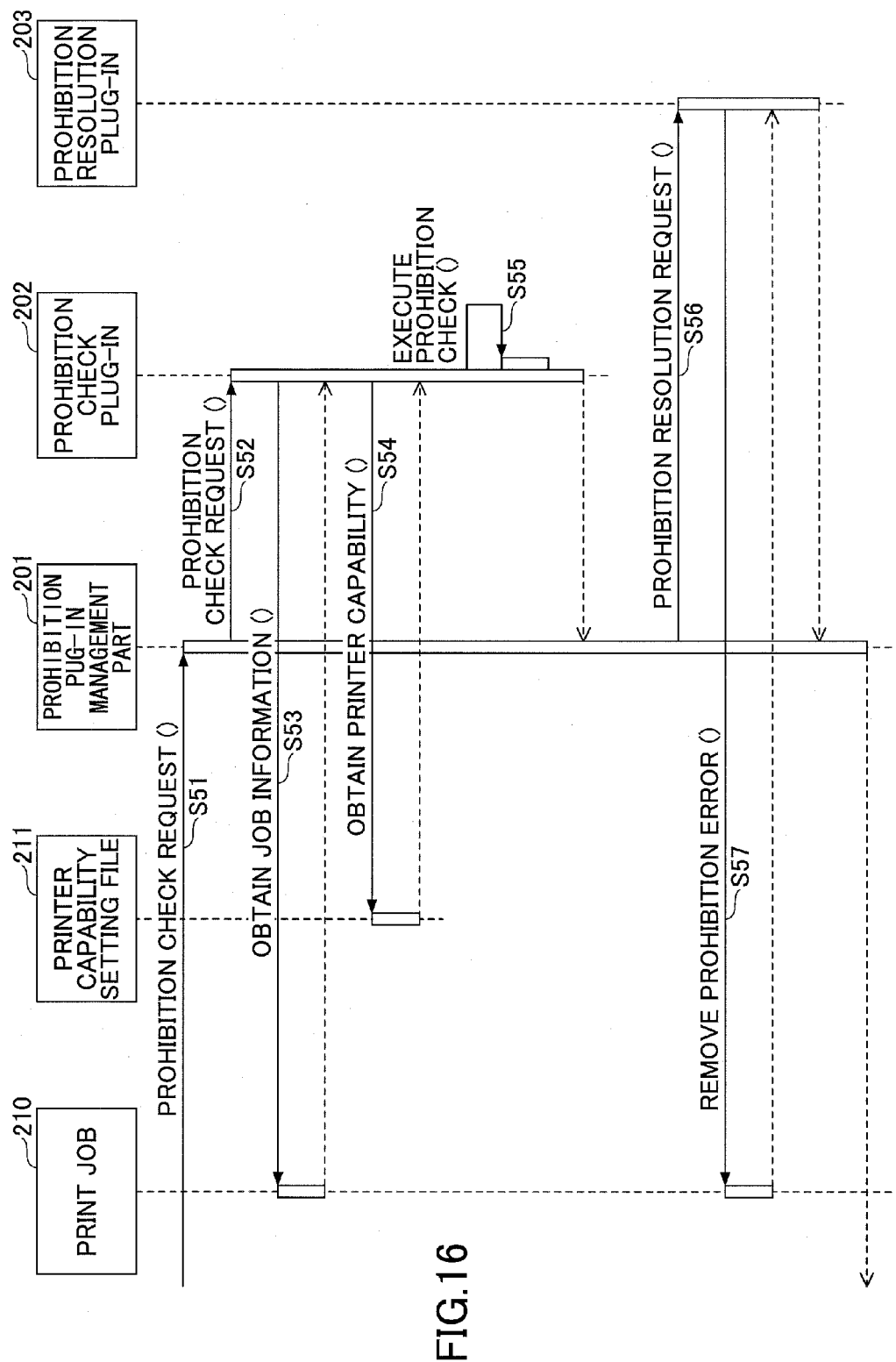
FIG. 16 is a sequence diagram of one example of processing carried out by a prohibition control part.

Below, a flow of processing of the prohibition control part 200 of FIG. 15 will be described. FIG. 16 is a sequence diagram of one example of processing carried out by the prohibition control part 200. In step S51, the prohibition plug-in management part 201 receives a prohibition check request. When having received the prohibition check request, the prohibition plug-in management part 201 sends the prohibition check request to the prohibition check plug-in 202, in step S52.

In step S53, the prohibition check plug-in 202 obtains information of printing settings from a print job 210. Further, in step S54, the prohibition check plug-in 202 obtains the function information and the functional prohibition information as a printer capability from a printer capability setting file 211 of the printer apparatus 31. It is noted that details of the printer capability setting file 211 will be described later. Further, the prohibition check plug-in 202 obtains the logical prohibition information from the print job editing application.

In step S55, the prohibition check plug-in 202 completes final prohibition information by merging the function information, the functional prohibition information and the logical prohibition information, which have been thus obtained. The prohibition check plug-in 202 carries out the prohibition check by comparing the information of the printing settings of the print job 210 with the final prohibition information.

The prohibition check plug-in 202 determines, based on the result of the comparison, whether there are functions that become unavailable according to the prohibition indicated by the final prohibition information. When there are functions that become unavailable according to the prohibition indicated by the final prohibition information, the prohibition check plug-in 202 reports these functions as the erroneous functions to the prohibition plug-in management part 201.

In step S56, the prohibition plug-in management part 201 sends a prohibition resolution request to the prohibition resolution plug-in 203. Then, in step S57, the prohibition resolution plug-in 203 reflects a cancellation of the erroneous functions in the information of the printing settings included in the print job 210.

It is noted that the prohibition resolution plug-in 203 may display the UI with which an operator can select the cancellation of the erroneous functions, and thus the operator may cancel the erroneous functions using the UI, as in the first embodiment described above.

<<Processing of Creating Final Prohibition Information>>

Figure 17:
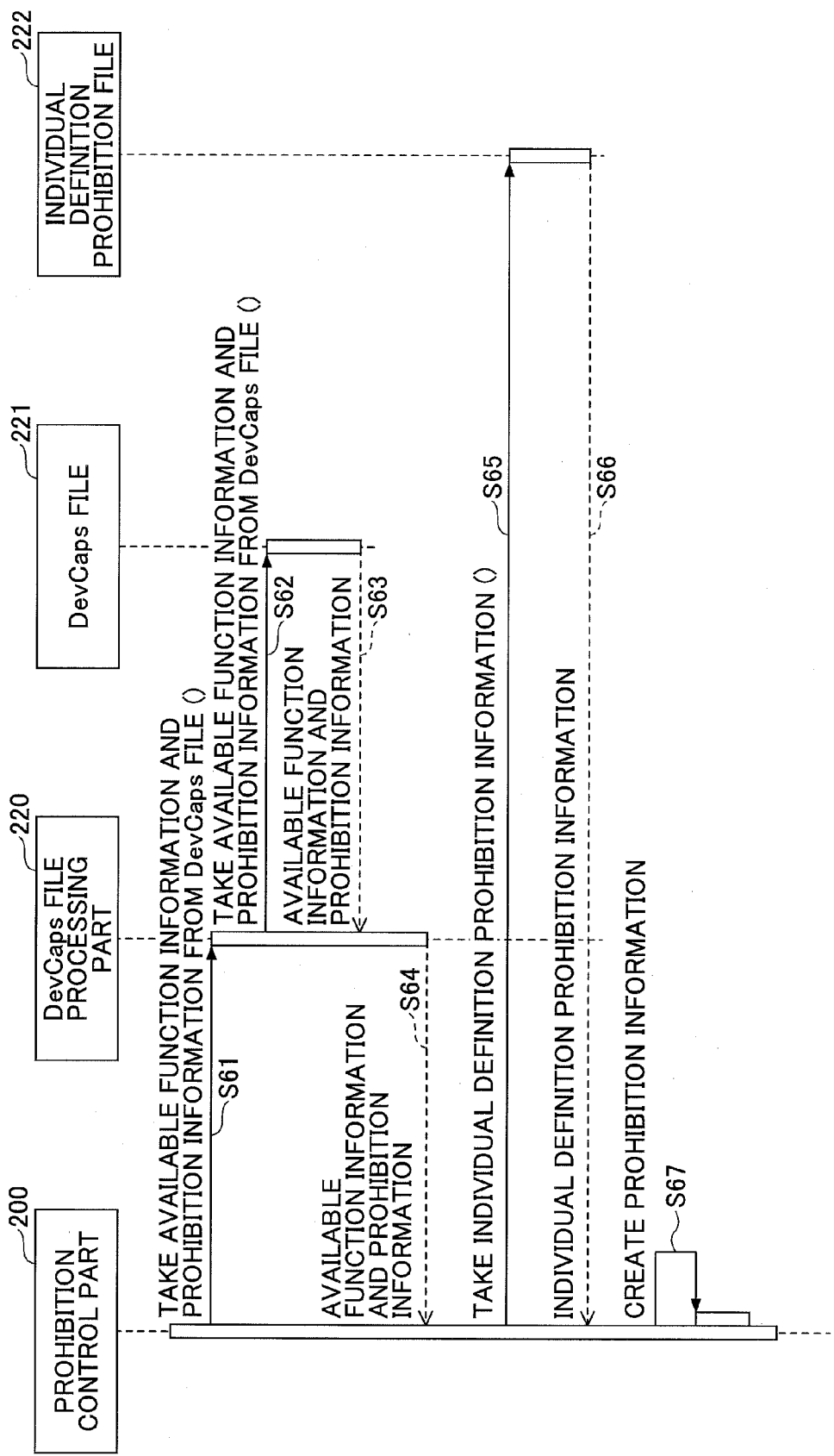
FIG. 17 is a sequence diagram of one example of processing to create final prohibition information.

FIG. 17 is a sequence diagram of one example of processing to create the final prohibition information. In step S61, the prohibition control part 200 requests the function information and the functional prohibition information as the printer capability from a DevCaps processing part 220. The DevCaps processing part 220 obtains the function information and the functional prohibition information as the printer capability from the DevCaps file 221, in steps S62 and S63.

It is noted that the DevCaps file 221 is the file describing the printer capability. For example, the DevCaps file 221 is described using a device function description format prescribed in a PostScript Printer Description (PPD) file.

Then, the processing proceeds to step S64, and the DevCaps file processing part 220 provides the function information and the functional prohibition information as the printer capability, obtained from the DevCaps file 221, to the prohibition control part 200.

Then, in steps S65 and S66, the prohibition control part 200 obtains individual definition prohibition information from an individual definition prohibition file 222 as one example of the logical prohibition information. The individual definition prohibition information is prohibition information of individual definitions (indicating, for example, individually defined prohibited functions or combinations of functions) other than the prohibition information recorded in the DevCaps file 221.

The processing proceeds to step S67, and the prohibition control part 200 completes the final prohibition information by merging the function information and the functional prohibition information as the printer capability obtained from the DevCaps file 221 and the individual definition prohibition information obtained from the individual definition prohibition file 222 as one example of the logical prohibition information.

<<Processing of Creating DevCaps File 221>>

The DevCaps file processing part 220 creates the DevCaps file 221 as follows. First, the DevCaps file processing part 220 uses a DevCaps definition file. The DevCaps definition file is a file storing DevCaps information depending on an apparatus. The DevCaps definition file exists for each of the printer apparatuses 31. Further, the DevCaps definition file is used as a base for creating the DevCaps file 221. The DevCaps file 221 is a file obtained from deleting and/or changing the definition contents obtained from the DevCaps definition file of the printer apparatus 31.

For example, the DevCaps file 221 has the contents in which the description included in the DevCaps definition file reflects information of a finisher, obtained from the printer apparatus 31 via a Management Information Base (MIB), as shown in FIG. 18. FIG. 18 illustrates one example of a part of the DevCaps file 221.

The DevCaps file 221 is divided into a function capability part and a prohibition condition part. For example, the DevCaps file 221 of FIG. 18 is one example of a description showing a part of the function capability part. In the DevCaps file 221 of FIG. 18, the description "False 1LeftA 1RightA 2Left 2Right 2Up Center" indicates that the corresponding stapling function is supported by the printer apparatus 31.

Further, FIG. 19 illustrates one example of the prohibition condition part of the DevCaps file 221. The prohibition condition part of the DevCaps file 221 of FIG. 19 indicates the functional prohibition information. It is noted that the individual definition prohibition file 222 is one example of the logical prohibition information. The individual definition prohibition file 222 may be described using the same format as that of the prohibition condition part of the DevCaps file 221.

Summary of Embodiments

According to the embodiments of the present invention, it is possible to cancel a setting of a function in a job ticket in consideration of the function information and the functional prohibition information of the printer apparatus 31 and the logical prohibition information of the print job editing application. The operator can determine whether to cancel a printing setting while understanding the printing setting of the function that becomes invalid.

It is noted that the prohibition information generation part 65 acts as a capability obtaining part. The error determination part 66 acts as a determination part. The screen page control part 61 acts as a display part. The client PC 11 acts as a print job editing apparatus. The print job editing application corresponds to a print job editing program.

The present invention is not limited to the specifically disclosed embodiments, and variations and modifications may be made without departing from the scope of the present invention.

The present Patent Application is based on Japanese Priority Patent Application No. 2011-045640, filed Mar. 2, 2011, and Japanese Priority Patent Application No. 2011-284021, filed Dec. 26, 2011, the entire contents of which are hereby incorporated herein by reference.

What is claimed is:

1. A non-transitory computer readable information recording medium storing a print job editing program, which, when executed by one or more processors of a computer, functions as:

a capability obtaining part configured to obtain information of a capability of a first image forming apparatus that is connected with the computer and a capability of a second image forming apparatus that is selected by a user in a printing process in which the computer is used;

a determination part configured to determine, when the capability obtaining part has obtained the information of the capability of the first and second image forming apparatus, functions that become unavailable for post printing processing, from among functions that have been set in a received print job, based on the information of the capability of the first and second apparatus and information of printing conditions that the print job editing program has; and a display part configured to display a list of the functions that become unavailable based on the determination of the determining part, and to confirm a cancellation of the settings of the functions that become unavailable, wherein the capability obtaining part is further configured to merge the information of the capability of the one of the first and second image forming apparatus selected by a user, functional prohibition information that indicates functionally prohibited combinations of post printing functions of the selected apparatus that contradict one another based on the a function provided by a post printing apparatus downstream from the selected image forming apparatus, and logical prohibition information of the print job editing program that indicates logically prohibited combinations of functions that are not allowed to be designated according to the print job editing program based on a relationship of structurally possible but logically conflicting print process instructions that, exclusive of user identification, interfere with layout settings of the print job to create final prohibition information.

2. The non-transitory computer readable information recording medium as claimed in claim 1, wherein
the information of the capability of the first and second apparatus includes function information indicating functions that can be executed separately and the functional prohibition information indicating functionally prohibited combinations of the functions, and the information of the printing conditions that the print job editing program has includes the logical prohibition information indicating combinations of the functions logically prohibited in relation to image information that the print job has.

3. The non-transitory computer readable information recording medium as claimed in claim 2, wherein
the display part is configured to receive a cancellation of part of the functions that become unavailable, and allow a state where the functions that become unavailable are set, depending on a predetermined condition.

4. The non-transitory computer readable information recording medium as claimed in claim 3, wherein
the determination part is configured to determine the functions that become unavailable at a time of receiving the print job, a time of changing a designation of the selected apparatus and a time of carrying out printing.

5. The non-transitory computer readable information recording medium as claimed in claim 4, wherein
at the time of the print job being received, the display part is configured to receive a cancellation of part of the functions that become unavailable and allow a state in which the functions that become unavailable are set.

6. The non-transitory computer readable information recording medium as claimed in claim 4, wherein
at the time of a change of a designation of the selected apparatus being received, the display part is configured to receive a cancellation of part of the functions that become unavailable based on the functional prohibition information and not allow a state where the functions that become unavailable based on the functional prohibition information are set.

7. The non-transitory computer readable information recording medium as claimed in claim 4, wherein
at the time of printing being carried out, the display part is configured to receive a cancellation of part of the functions that become unavailable based on the logical prohibition information and allow a state where the functions that become unavailable based on the logical prohibition information are set.

8. The non-transitory computer readable information recording medium as claimed in claim 4, wherein
at the time of the print job being received, the display part is configured to receive a cancellation of part of the functions that become unavailable based on any one of the function information, the functional prohibition information and the logical prohibition information and allow a state where the functions that become unavailable based on the any one of the function information, the functional prohibition information and the logical prohibition information are set;

at the time of a change of a designation of the selected apparatus being received, the display part is configured to receive a cancellation of all of the functions that become unavailable based on the function information or a cancellation of processing that causes the determination that the functions become unavailable based on the function information, receive a cancellation of part of the functions that become unavailable based on the functional prohibition information and not allow a state where the functions that become unavailable based on the functional prohibition information are set and allow a state where the functions that become unavailable based on the logical prohibition information are set; and at the time of printing being carried out, the display part is configured to receive a cancellation of all of the functions that become unavailable based on the function information or a cancellation of processing that causes the determination that the functions become unavailable based on the function information, receive a cancellation of part of the functions that become unavailable based on the functional prohibition information and not allow a state where the functions that become unavailable based on the functional prohibition information are set, and receive a cancellation of part of the functions that become unavailable based on the logical prohibition information and allow a state where the functions that become unavailable based on the logical prohibition information are set.

9. A printing system comprising:
the print job editing program claimed in claim 1.

10. The non-transitory computer readable information recording medium as claimed in claim 1, wherein the functions become unavailable due to at least one of a change of a selected apparatus by a user and a change of the post printing functions by the user.

11. The non-transitory computer readable information recording medium as claimed in claim 1, wherein functional prohibition information defines functions that exist and can be set separately, but cannot be combined.

12. The non-transitory computer readable information recording medium as claimed in claim 1, wherein logical prohibition defines functions that exist, can be set separately, and can be combined, but the combination thereof is prohibited in the print job editing application.

13. A print job editing apparatus comprising:
a processor; and
a storage unit storing executable code that when executed by the processor causes the processor to implement
  a capability obtaining part configured to obtain information of a capability of a first image forming apparatus that is connected with a computer and a capability of a second image forming apparatus that is used in a printing process in which the computer is used;
  a determination part configured to determine, when the capability obtaining part has obtained the information of the capability of the first and second image forming apparatus, functions that become unavailable for post printing processing, from among functions that have been set in a received print job, based on the information of the capability of the first and second image forming apparatus and information of printing conditions that a print job editing program has; and
  a display part configured to display a list of the functions that become unavailable based on the determination of the determining part, and to confirm a cancellation of the settings of the functions that become unavailable, wherein
  the capability obtaining part is further configured to merge the information of the capability of one of the first and second image forming apparatus selected by a user, functional prohibition information that indicates functionally prohibited combinations of post printing functions of the selected apparatus that contradict one another based on a function provided by a post printing apparatus downstream from the selected image forming apparatus, and logical prohibition information of the print job editing program that indicates logically prohibited combinations of functions that are not allowed to be designated according to the print job editing program based on a relationship of structurally possible but logically conflicting print process instructions that, exclusive of user identification, interfere with layout settings of the print job to create final prohibition information.

14. The print job editing apparatus as claimed in claim 13, wherein the functions become unavailable due to at least one of a change of a selected apparatus by a user and a change of the post printing functions by a user.

15. The print job editing apparatus of claim 13, wherein functional prohibition information defines functions that exist and can be set separately, but cannot be combined.

16. The print job editing apparatus of claim 13, wherein logical prohibition defines functions that exist, can be set separately, and can be combined, but the combination thereof is prohibited in the print job editing application.

17. A print job editing method comprising:
  a computer obtaining information a capability of a first image forming apparatus that is connected with the computer and a capability of a second image forming apparatus that is used in a printing process in which the computer is used;
  the computer determining, when the obtaining has obtained the information of the capability of the first and second image forming apparatus, functions that become unavailable for post printing processing, from among functions that have been set in a received print job, based on the information of the capability of the first and second image forming apparatus and information of printing conditions that a print job editing program has;
  the computer displaying a list of the functions that become unavailable based on the determining, and allowing to confirm a cancellation of the settings of the functions that become unavailable; and
  merging the information of the capability of one of the first and second image forming apparatus selected by a user, including functional prohibition information that indicates functionally prohibited combinations of post printing functions of the selected apparatus that contradict one another based on a function provided by a post printing apparatus downstream from the selected image forming apparatus, and logical prohibition information of the print job editing program that indicates logically prohibited combinations of functions that are not allowed to be designated according to the print job editing program based on a relationship of structurally possible but logically conflicting print process instructions that, exclusive of user identification, interfere with layout settings of the print job to create final prohibition information.

18. The print job editing method as claimed in claim 17, wherein the functions become unavailable due to at least one of a change of a selected apparatus by a user and a change of the post printing functions by a user.

* * * * *